United States Patent [19]

Severinsky

[11] Patent Number: 5,343,970
[45] Date of Patent: Sep. 6, 1994

[54] HYBRID ELECTRIC VEHICLE

[76] Inventor: Alex J. Severinsky, 10904 Pebble Run, Silver Spring, Md. 20902

[21] Appl. No.: 947,691

[22] Filed: Sep. 21, 1992

[51] Int. Cl.⁵ .............................................. B60K 6/04
[52] U.S. Cl. ................... 180/65.2; 180/65.6; 180/165; 60/718; 475/2; 475/5
[58] Field of Search .............. 180/65.2, 65.3, 65.4, 180/65.6, 165; 60/716, 718; 475/2, 5, 8, 9

[56] References Cited

U.S. PATENT DOCUMENTS

| | | | |
|---|---|---|---|
| 3,525,874 | 8/1970 | Toy | 180/65.2 |
| 3,566,717 | 3/1971 | Berman et al. | 180/65.2 |
| 3,650,345 | 3/1972 | Yardney | 180/65.2 |
| 3,732,751 | 5/1973 | Berman et al. | 180/65.2 |
| 3,791,473 | 2/1974 | Rosen | 180/65.2 |
| 3,837,419 | 9/1974 | Nakamura | 180/65.4 |
| 3,874,472 | 4/1975 | Deane | 180/65.4 |
| 3,923,115 | 12/1975 | Helling | 180/65.2 |
| 4,042,056 | 8/1977 | Horwinski | 180/65.2 |
| 4,095,664 | 6/1978 | Bray | 180/65.4 |
| 4,148,192 | 4/1979 | Cummings | 180/65.2 |
| 4,180,138 | 12/1979 | Shea | 180/65.2 |
| 4,269,280 | 5/1981 | Rosen | 180/65.2 |
| 4,305,254 | 12/1981 | Kawakatsu et al. | 180/65.2 |
| 4,306,156 | 12/1981 | Monaco et al. | 180/65.2 |
| 4,313,080 | 1/1982 | Park | 180/65.2 |
| 4,335,429 | 6/1982 | Kawakatsu | 180/65.2 |
| 4,351,405 | 9/1982 | Fields et al. | 180/65.2 |
| 4,354,144 | 10/1982 | McCarthy | 180/65.4 |
| 4,400,997 | 8/1983 | Fiala | 180/65.2 |
| 4,405,029 | 9/1983 | Hunt | 180/65.2 |
| 4,407,132 | 10/1983 | Kawakatsu et al. | 180/65.4 |
| 4,438,342 | 3/1984 | Kenyon | 180/65.2 |
| 4,439,989 | 4/1984 | Yamakawa | 60/718 |
| 4,470,476 | 9/1984 | Hunt | 180/65.2 |
| 4,533,011 | 8/1985 | Heidemeyer et al. | 180/65.2 |
| 4,562,894 | 1/1986 | Yang | 180/65.2 |
| 4,578,955 | 4/1986 | Medina | 180/65.4 |
| 4,593,779 | 6/1986 | Kröhling | 180/65.4 |
| 4,611,466 | 9/1986 | Keedy | 60/718 |
| 4,697,660 | 10/1987 | Wu et al. | 180/65.2 |
| 4,815,334 | 3/1989 | Lexen | 74/661 |
| 4,923,025 | 5/1990 | Ellers | 180/65.2 |
| 4,951,769 | 8/1990 | Kawamura | 180/65.4 |
| 5,053,632 | 10/1991 | Suzuki et al. | 180/65.2 |
| 5,117,931 | 6/1992 | Nishida | 180/65.2 |
| 5,120,282 | 6/1992 | Fjallstrom | 180/65.4 X |

OTHER PUBLICATIONS

SAE Technical Paper Series 891659, Bullock, pp. 11-26, Aug. 7-10, 1989.
SAE Technical Paper Series 910247, Kalberlah, pp. 69-78, Feb. 25-Mar. 1, 1991.

Primary Examiner—Margaret A. Focarino
Assistant Examiner—Peter C. English

[57] ABSTRACT

An improved hybrid electric vehicle includes an internal combustion engine and an electric motor. Both the motor and the engine provide torque to drive the vehicle directly through a controllable torque transfer unit. Typically at low speeds or in traffic, the electric motor alone drives the vehicle, using power stored in batteries; under acceleration and during hill climbing both the engine and the motor provide torque to drive the vehicle; and in steady state highway cruising, the internal combustion engine alone drives the vehicle. The internal combustion engine is sized to operate at or near its maximum fuel efficiency during highway cruising. The motor is operable as a generator to charge the batteries as needed and also for regenerative braking. No transmission is employed. The motor operates at significantly lower currents and higher voltages than conventionally and has a rated power at least equal to that of the internal combustion engine. In this manner a cost efficient vehicle is provided, suffering no performance disadvantage compared to conventional vehicles.

40 Claims, 12 Drawing Sheets

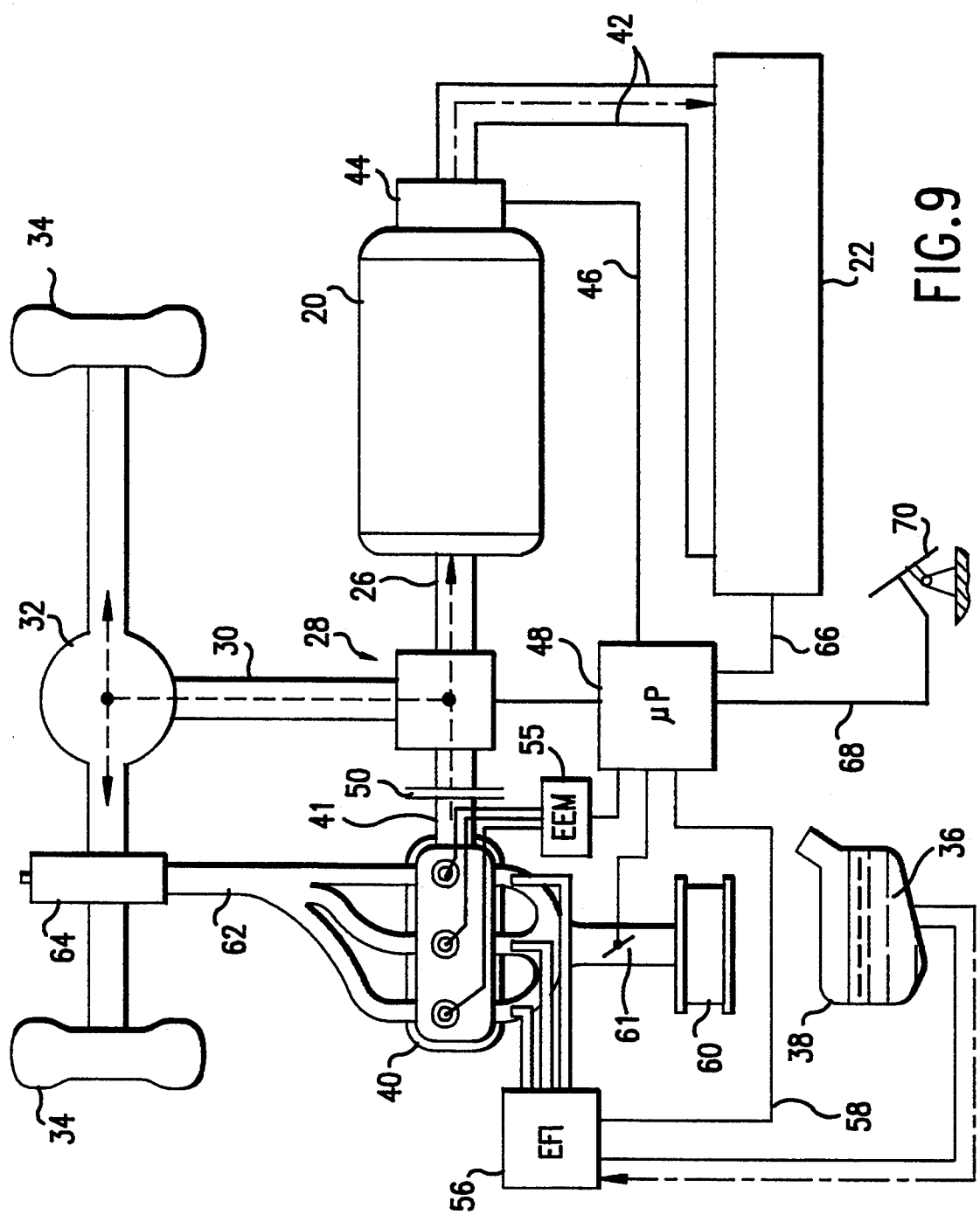

HYBRID ELECTRIC VEHICLE

BACKGROUND OF THE INVENTION

1. Field of the Invention

This invention is in the field of hybrid electric vehicles incorporating both an internal combustion engine, such as a gasoline engine, and an electric motor as sources of torque to drive the vehicle. More particularly, this invention relates to a hybrid electric vehicle that is fully competitive with presently conventional vehicles as regards performance, operating convenience, and cost, while achieving substantially improved fuel economy and reduced pollutant emissions.

2. Discussion of the Prior Art

For many years great attention has been given to the problem of reduction of fuel consumption of automobiles and other highway vehicles. Concomitantly very substantial attention has been paid to reduction of pollutants emitted by automobiles and other vehicles. To a degree, efforts to solve these problems conflict with one another. For example, increased thermodynamic efficiency and thus reduced fuel consumption can be realized if an engine is operated at higher temperatures. Thus there has been substantial interest in engines built of ceramic materials withstanding higher combustion temperatures than those now in use. However, higher combustion temperatures in gasoline-fueled engines lead to increase in certain undesirable pollutants, typically $NO_x$.

Another possibility for reducing emissions is to burn mixtures of gasoline and ethanol ("gasohol") or straight ethanol. However, to date ethanol has not become economically competitive with gasoline and consumers have not accepted ethanol to any great degree.

One proposal for reducing pollution in cities is to limit the use of vehicles powered by internal combustion engines and instead employ electric vehicles powered by rechargeable batteries. To date, all such electric cars have a very limited range, typically no more than 150 miles, have insufficient power for acceleration and hill climbing except when the batteries are fully charged, and require substantial time for battery recharging. Thus, while there are many circumstances in which the limited range and extended recharge time of the batteries would not be an inconvenience, such cars are not suitable for all the travel requirements of most individuals. Accordingly, an electric car would have to be an additional vehicle for most users, posing a substantial economic deterrent. Moreover, it will be appreciated that in the United States most electricity is generated in coal-fired power plants, so that using electric vehicles merely moves the source of the pollution, but does not eliminate it. Furthermore, comparing the respective net costs per mile of driving, electric vehicles are not competitive with ethanol-fueled vehicles, much less with conventional gasoline-fueled vehicles.

Much attention has also been paid over the years to development of electric vehicles including internal combustion engines powering generators, thus eliminating the defect of limited range exhibited by simple electric vehicles. The simplest such vehicles operate on the same general principle as diesel-electric locomotives used by most railroads. In such systems, an internal combustion engine drives a generator providing electric power to traction motors connected directly to the wheels of the vehicle. This system has the advantage that no variable gear ratio transmission is required between the diesel engine and the wheels of the locomotive. More particularly, an internal combustion engine produces zero torque at zero engine speed (RPM) and reaches its torque peak somewhere in the middle of its operating range. Accordingly, all vehicles driven directly by an internal combustion engine (other than certain single-speed vehicles using friction or centrifugal clutches, and not useful for normal driving) require a multiple speed transmission between the engine and the wheels, so that the engine's torque can be matched to the road speeds and loads encountered. Further, some sort of clutch must be provided so that the engine can be decoupled from the wheels, allowing the vehicle to stop while the engine is still running, and to allow some slippage of the engine with respect to the drive train while starting from a stop. It would not be practical to provide a diesel locomotive with a multiple speed transmission, or a clutch. Accordingly, the additional complexity of the generator and electric traction motors is accepted. Electric traction motors produce full torque at zero RPM and thus can be connected directly to the wheels; when it is desired that the train should accelerate, the diesel engine is simply throttled to increase the generator output and the train begins to move.

The same drive system may be employed in a smaller vehicle such as an automobile or truck, but has several distinct disadvantages in this application. In particular, it is well known that a gasoline or other internal combustion engine is most efficient when producing near its maximum output torque. Typically, the number of diesel locomotives on a train is selected in accordance with the total tonnage to be moved and the grades to be overcome, so that all the locomotives can be operated at nearly full torque production. Moreover, such locomotives tend to be run at steady speeds for long periods of time. Reasonably efficient fuel use is thus achieved. However, such a direct drive vehicle would not achieve good fuel efficiency in typical automotive use, involving many short trips, frequent stops in traffic, extended low-speed operation and the like.

So-called "series hybrid" electric vehicles have been proposed wherein batteries are used as energy storage devices, so that the engine can be operated in its most fuel-efficient output power range while still allowing the electric traction motor(s) powering the vehicle to be operated as required. Thus the engine may be loaded by supplying torque to a generator charging the batteries while supplying electrical power to the traction motor(s) as required, so as to operate efficiently. This system overcomes the limitations of electric vehicles noted above with respect to limited range and long recharge times.

However, such series hybrid electric vehicles are inefficient and grossly uneconomical, for the following reasons. In a conventional vehicle, the internal combustion engine delivers torque to the wheels directly. In a series hybrid electric vehicle, torque is delivered from the engine via a serially connected generator, battery charger, inverter and the traction motor. Energy transfer between those components consumes at least approximately 25% of engine power. Further such components add substantially to the cost and weight of the vehicle. Thus, series hybrid vehicles have not been immediately successful.

A more promising "parallel hybrid" approach is shown in U.S. Pat. Nos. 3,566,717 and 3,732,751 to Berman et al. In Berman et al an internal combustion engine and an electric motor are matched through a complex gear train so that both can provide torque directly to the wheels.

In Berman et al, the internal combustion engine is run in several different modes. Where the output of the internal combustion engine is more than necessary to drive the vehicle ("first mode operation") the engine is run at constant speed and excess power is converted by a first generator ("speeder") to electrical energy for storage in a battery. In "second mode operation", the internal combustion engine drives the wheels directly, and is throttled. When more power is needed than the engine can provide, a second motor generator or "torquer" provides additional torque as needed.

The present invention relates to such a parallel hybrid vehicle, but addresses certain substantial deficiencies of the Berman et al design. For example, Berman et al show two separate electric motor/generators powered by the internal combustion engine to charge batteries and to drive the vehicle forward in traffic. This arrangement is a source of additional complexity, cost and difficulty, as two separate modes of engine control are required, and the operator must control the transition between the several modes of operation. Further the gear train shown by Berman et al appears to be quite complex and difficult to manufacture economically. Berman et al also indicate that one or even two variable-speed transmissions may be required; see col. 3, lines 19–22 and 36–38.

Hunt U.S. Pat. Nos. 4,405,029 and 4,470,476 also disclose parallel hybrids requiring complex gearing arrangements, including multiple speed transmissions. More specifically, the Hunt patents disclose several embodiments of parallel hybrid vehicles. Hunt indicates (see col. 4, lines 6–20 of the '476 patent) that an electric motor may drive the vehicle at low speeds up to 20 mph, and an internal combustion engine used for speeds above 20 mph, while "in certain speed ranges, such as from 15–30 mph, both power sources may be energized. . . . Additionally, both power sources could be utilized under heavy load conditions." Hunt also indicates that "the vehicle could be provided with an automatic changeover device which automatically shifts from the electrical power source to the internal combustion power source, depending on the speed of the vehicle" (col. 4, lines 12–16).

However, the Hunt vehicle does not meet the objects of the present invention. Hunt's vehicle in each embodiment requires a conventional manual or automatic transmission. See col. 2, lines 6–7. Moreover, the internal combustion engine is connected to the transfer case (wherein torque from the internal combustion engine and electric motor is combined) by a "fluid coupling or torque converter of conventional construction". Col. 2, lines 16–17. Such transmissions and fluid couplings or torque converters are very inefficient, are heavy, bulky, and costly, and are to be eliminated according to one object of the present invention.

Furthermore, the primary means of battery charging disclosed by Hunt involves a further undesirable complexity, namely a turbine driving the electric motor in generator configuration. The turbine is fueled by waste heat from the internal combustion engine. See col. 3, lines 10–60. Hunt's internal combustion engine is also fitted with an alternator, for additional battery charging capability, adding yet further complexity. Thus it is clear that Hunt fails to teach a hybrid vehicle meeting the objects of the present invention—that is, a hybrid vehicle competitive with conventional vehicles with respect to performance, cost and complexity, while achieving substantially improved fuel efficiency.

Kawakatsu U.S. Pat. No. 4,335,429 shows a parallel hybrid involving a single internal combustion engine and two electric motors to allow efficient use of the electric motors, and is directed principally to a complex control scheme.

Numerous patents disclose hybrid vehicle drives tending to fall into one or more of the categories discussed above. A number of patents disclose systems wherein an operator is required to select between electric and internal combustion operation; for example an electric motor is provided for operation inside buildings where exhaust fumes would be dangerous. In several cases the electric motor drives one set of wheels and the internal combustion engine drives a different set. See generally, U.S. Pat. Nos.; Shea (4,180,138); Fields et al (4,351,405); Kenyon (4,438,342); Kröhling (4,593,779); and Ellers (4,923,025).

Numerous other patents show hybrid vehicle drives wherein a variable speed transmission is required. A transmission as noted above is typically required where the electric motor is not capable of supplying sufficient torque at low speeds. See U.S. Pat. Nos.; Rosen (3,791,473); Rosen (4,269,280); Fiala (4,400,997); and Wu et al (4,697,660). For further examples of series hybrid vehicles as discussed above, see generally Bray (4,095,664); Cummings (4,148,192); Kawakatsu et al (4,305,254 and 4,407,132); Monaco et al (4,306,156); Park (4,313,080); McCarthy (4,354,144); Heidemeyer (4,533,011); Kawamura (4,951,769); and Suzuki et al (5,053,632). Other patents of general relevance to this subject matter include Toy (3,525,874); Yardney (3,650,345); Nakamura (3,837,419); Deane (3,874,472); Horwinski (4,042,056); Yang (4,562,894); Keedy (4,611,466); and Lexen (4,815,334).

U.S. Pat. No. 4,578,955 to Medina shows a hybrid system wherein a gas turbine is used as the internal combustion engine to drive a generator as needed to charge batteries. Of particular interest to certain aspects of the present invention is that Medina discloses that the battery pack should have a voltage in the range of 144, 168 or 216 volts and the generator should deliver current in the range of 400 to 500 amperes. Those of skill in the art will recognize that these high currents involve substantial resistance heating losses, and additionally require that all electrical connections be made by positive mechanical means such as bolts and nuts, or by welding. More specifically, for reasons of safety and in accordance with industry practice, currents in excess of about 50 amperes cannot be carried by the conventional plug-in connectors preferred for reasons of convenience and economy, but must be carried by much heavier, more expensive and less convenient fixed connectors (as used on conventional starter and battery cable connections). Accordingly, it would be desirable to operate the electric motor of a hybrid vehicle at lower currents.

U.S. Pat. No. 4,439,989 to Yamakawa shows a system wherein two different internal combustion engines are provided so that only one need be run when the load is low. This arrangement would be complex and expensive to manufacture.

Detailed discussion of various aspects of hybrid vehicle drives may be found in Kalberlah, "Electric Hybrid Drive Systems for Passenger Cars and Taxis", SAE Paper No. 910247 (1991), and in Bullock, "The Technological Constraints of Mass, Volume, Dynamic Power Range and Energy Capacity on the Viability of Hybrid and Electric Vehicles", SAE Paper No. 891659 (1989). Further related papers are collected in *Electric and Hybrid Vehicle Technology*, volume SP-915, published by SAE in February 1992. Reference herein to the latter volume does not concede its effectiveness as prior art with respect to the claims of the present application.

It can thus be seen that while the prior art clearly discloses the desirability of operating an internal combustion engine in its most efficient operating range, and that a battery may be provided to store energy to be supplied to an electric motor in order to even out the load on the internal combustion engine, there remains substantial room for improvement. In particular, it is desired to obtain the operational flexibility of a parallel hybrid system, while optimizing the system's operational parameters and providing a substantially simplified parallel hybrid system as compared to those shown in the prior art.

OBJECTS AND SUMMARY OF THE INVENTION

It is an object of the invention to provide an improved hybrid electric vehicle realizing substantially increased fuel economy and reduced pollutant emissions as compared to present day vehicles while suffering no significant penalty in performance, operating convenience, cost, complexity, or weight.

It is a more particular object of the present invention to provide an improved parallel hybrid electric vehicle wherein an internal combustion engine and an electric motor can separately or simultaneously apply torque to the driving wheels of the vehicle, controlled to realize maximum fuel efficiency at no penalty in convenience, performance, or cost.

It is a further object of the invention to provide a parallel hybrid electric vehicle wherein the electric motor provides output power equal to at least 100 percent of the rated output power of the internal combustion engine, and more preferably up to about 150–200 percent thereof, so that the engine operates under substantially optimum conditions in order to realize substantial fuel economy of operation.

More particularly, it is an object of the invention to provide a parallel hybrid electric vehicle wherein the internal combustion engine is sized to efficiently provide the average power required for operation at moderate and highway speeds, with the electric motor sized to deliver the additional power needed for acceleration and hill climbing.

Still another object of the invention is to provide a hybrid electric vehicle wherein the electric motor and battery charging circuits operate at no more than about 30–50 amperes maximum current, whereby resistance heating losses are greatly reduced, and whereby inexpensive and simple electrical manufacturing and connection techniques can be employed.

It is a further object of the invention to provide a solid-state switching power converter for converting DC power provided by the batteries of a parallel hybrid electric vehicle to AC power of higher frequency than conventionally employed for supply to an AC induction motor for powering the vehicle as needed, and for converting mechanical energy provided to the induction motor when operated as a generator to DC energy for charging the batteries as required.

Other aspects and objects of the invention will become clear as the discussion below proceeds.

The present invention satisfies the needs of the art and objects of the invention mentioned above by provision of an improved parallel hybrid electric vehicle. An internal combustion engine and an AC induction motor are arranged to supply torque through a controllable torque transfer unit to the driving wheels of the vehicle. The motor is driven at relatively high voltage, relatively high frequency, and relatively low maximum current. Energy stored in batteries is transformed into AC drive pulses of appropriate frequency and shape by a solid state switching unit comprising metal oxide semiconductor (MOS) controlled thyristors. No variable gear ratio transmission is required by the vehicle of the present invention, as the AC electric motor provides adequate torque at low RPM. Inefficiencies particularly inherent in automatic transmissions are thus eliminated.

A microprocessor receives control inputs from the driver of the vehicle and monitors the performance of the electric motor and the internal combustion engine, the state of charge of the battery, and other significant variables. The microprocessor determines whether the internal combustion engine or the electric motor or both should provide torque to the wheels under various monitored operating conditions. Typically, the electric motor operates under battery power during low speed operation, e.g., in traffic, during reverse operation, or the like. In this mode of operation, the energy transfer efficiency from the batteries to the wheels is very high. By comparison, it will be appreciated that a vast amount of fuel is wasted as internal combustion engines of conventional vehicles idle uselessly at stop lights or in traffic. This source of inefficiency and pollution is eliminated according to the invention.

As the road speed increases, the internal combustion engine is started, using torque provided by the electric motor through the torque transfer unit, such that no separate starter is required. The internal combustion engine is sized to operate near maximum efficiency during steady state cruising on the highway, at between about 35 and 65 mph; at these times the electric motor is not powered. When necessary for acceleration or hill climbing, the electric motor is operated to add its torque to that provided by the internal combustion engine. Under braking or coasting conditions, the electric motor may be operated as a generator to charge the batteries.

For comparison to an example of the hybrid electric vehicle of the invention, a conventional 3,300 pound sedan is typically powered by a 165 horsepower internal combustion engine driving the rear wheels through an automatic transmission. However, during highway cruising and in traffic, that is, under the most common operating conditions, only 2–30 hp is required. Therefore, the internal combustion engine of a conventional vehicle rarely operates near maximum efficiency. Moreover, as noted, such vehicles are normally driven through notoriously inefficient automatic transmissions; specifically, such transmissions are typically only about 60% efficient during operation in the indirect gears, i.e., during acceleration.

A comparable 3,300 pound sedan according to the invention has an internal combustion engine of about 45 horsepower working in concert with a 65 horsepower electric motor, without a transmission. This combination provides acceleration and hill climbing performance equivalent to a conventional vehicle with a 165 hp internal combustion engine with automatic transmission, while yielding a 200–300% improvement in net fuel efficiency and at least a similar reduction in pollutants emitted. Moreover, the vehicle of the present invention is no heavier, no more bulky and no more expensive to manufacture than conventional vehicles using standard internal combustion engines.

More particularly, according to the invention, the internal combustion engine is operated only under the most efficient conditions of output power and speed. When the engine can be used efficiently to drive the vehicle forward, e.g. in highway cruising, it is so employed. Under other circumstances, e.g. in traffic, the electric motor alone drives the vehicle forward and the internal combustion engine is used only to charge the batteries as needed. No transmission is required, thus effecting a very substantial saving in both weight and cost. The AC electric motor is controlled to operate as a constant torque source at low motor speeds, and as a constant power source at higher speeds. The motor operates at relatively low currents and relatively high voltage and frequency, as compared with conventional practice. Connections between the battery and the electric motor are substantially simplified through the use of relatively low maximum current, and at relatively resistance heating losses are likewise reduced substantially.

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components.

BRIEF DESCRIPTION OF THE DRAWINGS

FIGS. 4–9 are schematic diagrams of the hybrid drive system according to the invention operating in different modes and showing flow of energy, in the form of stored electrical energy or fossil fuel, and of power, as torque from either the electric motor or the internal combustion engine;

DESCRIPTION OF THE PREFERRED EMBODIMENTS

Figure 1:
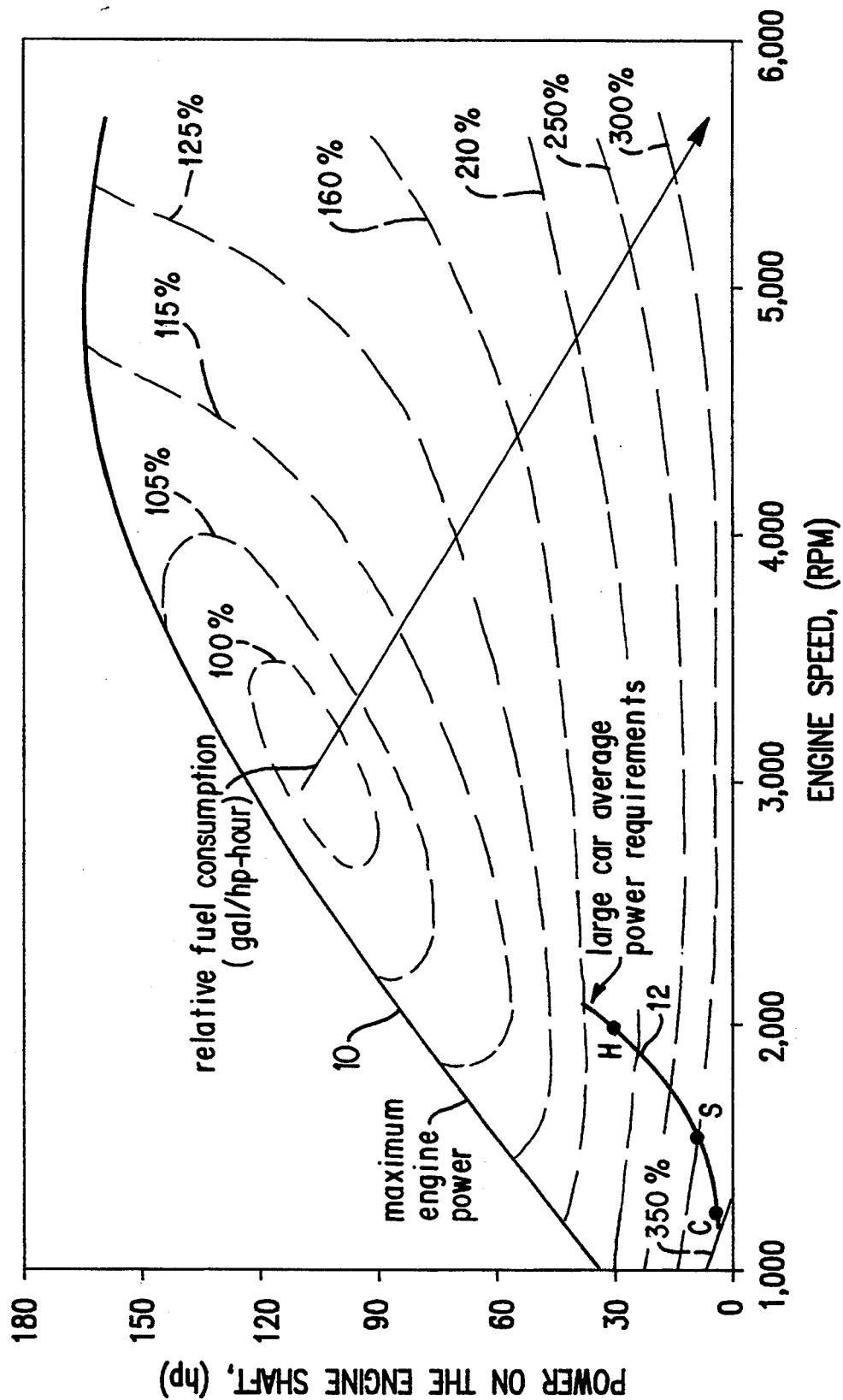
FIG. 1 is a plot of output power versus rotational speed (RPM) for a typical internal combustion engine, illustrating the relative fuel consumption of the engine as used in a conventional automobile in gallons/horsepower-hour.

Referring specifically to FIG. 1, curve 10 represents the output power versus engine speed (RPM) of a typical spark ignition gasoline-fueled internal combustion engine as used with an automatic transmission in a typical sedan of 3,300 pounds. As can be seen, the maximum engine power available is about 165 horsepower at about 5,000 RPM. Also shown in FIG. 1 by curve 12 are the average power requirements of such a vehicle. Points C, S and H on curve 12 show average fuel consumption in city, suburban and highway driving, respectively. Point C on curve 12 shows that the average power required in typical city driving is less than 5 hp. Point S shows that the average power consumed in suburban driving is 10 hp, and point H shows that the power needed for steady-speed highway driving is only about 30 hp. Thus, the vehicle is vastly overpowered at all times except during acceleration or hill-climbing.

FIG. 1 also includes curves indicating the relative fuel consumption of the engine. As can be seen, reasonable fuel efficiency, that is, at least about 105 percent relative fuel consumption (100% being ideal), is reached only when the engine is operated at between about 2,000 and 4,000 RPM, when producing between about 75 and 150 horsepower. FIG. 1 thus indicates that the typical internal combustion engine operates with reasonable efficiency only when producing between about 50 and about 90% of its maximum output power. The typical automobile only requires such substantial power under conditions of extreme acceleration or hill climbing. Thus, only during relatively brief intervals is the engine operating efficiently. As can be seen, during typical highway driving, shown by point H on curve 12, the relative fuel consumption is on the order of 190 percent of that required during the most efficient operation of the engine. The situation is even worse in suburban driving, where the relative fuel consumption is nearly 300 percent of the most efficient value, and in city driving, where the relative fuel consumption is almost 350 percent of that required at most efficient operation.

FIG. 1 thus demonstrates that an internal combustion engine having sufficient horsepower for adequate acceleration and hill climbing capability must be so oversized with respect to the loads encountered during most normal driving that the engine is grossly inefficient in its consumption of fuel. As noted, FIG. 1 further shows that only about 30 horsepower is needed to cruise on the highway even in a relatively large car.

Figure 2:
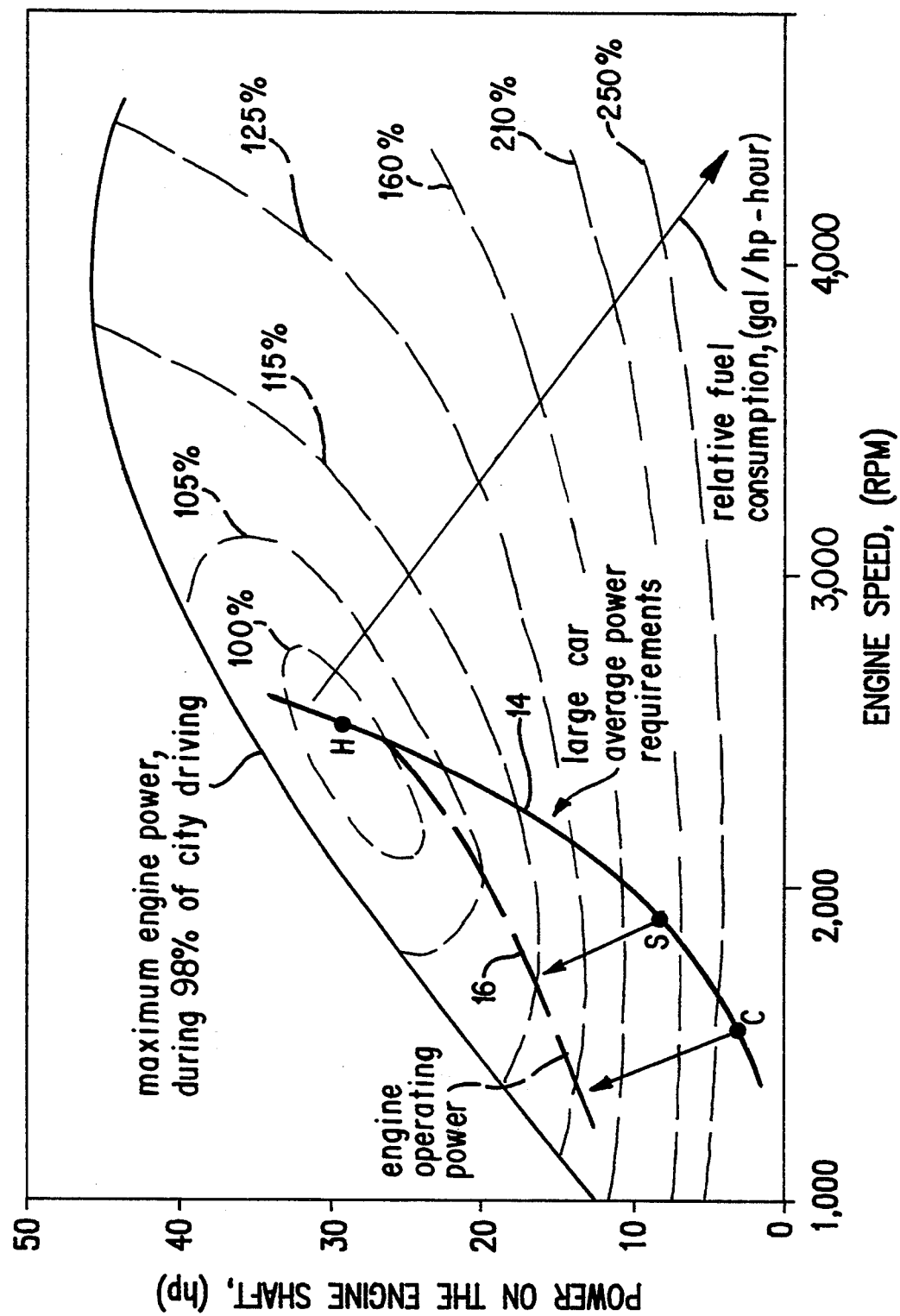
FIG. 2 is a similar plot describing operation of a relatively small internal combustion engine used in the present invention under circumstances similar to those depicted in FIG. 1.

FIG. 2 is similar to FIG. 1, and illustrates the operational characteristics of the same 3,300 pound car if driven by a relatively small engine having a maximum horsepower rating of about 45 horsepower at 4,000 RPM. The power requirement of the vehicle during highway cruising, shown by point H on curve 14, is in the center of the most efficient region of operation of the engine. However, even with this small engine thus optimized for highway cruising, there is a substantial gap between the engine operating power line 16 and the average power requirement line 14. That is, even this small engine produces substantially more power at low RPM than needed for city driving (point C) or for suburban driving (point S). Accordingly, even with a small engine sized appropriately for highway cruising, substantial inefficiencies at lower speeds persist. Moreover, of course, such a vehicle would have unsatisfactory acceleration and hill climbing ability. Therefore, the answer is not simply to replace large internal combustion engines with smaller internal combustion engines.

The prior art recognizes that there are substantial advantages to be gained by combining the virtues of a gasoline or other internal combustion engine with those of an electric motor running from a battery charged by the internal combustion engine. However the prior art has failed to provide a solution which is directly price and performance competitive with vehicles now on the market.

As indicated above, "straight" electric vehicles, that is, vehicles having electric traction motors and batteries requiring recharge at the end of each day's use, do not have sufficient range and require too much time to recharge to fully replace conventional automobiles. Further, the operational costs of such vehicles are not competitive with internal combustion vehicles operated on fuels derived from renewable resources such as ethanol, and are even less competitive with gasoline-fueled automobiles.

A first type of series hybrid vehicles, involving a gasoline engine driving a generator charging a battery powering an electric traction motor, are limited in acceleration and hill climbing ability unless the electric motor is made very large, costly, and bulky. The alternative series hybrid approach, involving a transmission between a relatively smaller electric motor and the wheels to provide the torque needed to accelerate quickly, loses the virtue of simplicity obtained by elimination of a multi-speed transmission. These vehicles fail to realize the advantages provided by the parallel hybrid system in which both an internal combustion engine and an electric motor provide torque to the wheels as appropriate. However, the prior art relating to parallel hybrid vehicles fails to disclose a system sufficiently simple for economical manufacture. The art further has failed to teach the optimum method of operation of a parallel hybrid vehicle.

Moreover, the art relating to parallel hybrids does not teach the appropriate operational parameters to be employed, relating to the relative power outputs of the internal combustion engine and the electric motor; the type of electric motor to be employed; and the frequency, voltage, and current characteristics of the motor/battery system.

According to one aspect of the invention, the internal combustion engine of a hybrid vehicle is sized to supply adequate power for highway cruising, preferably with some additional power in reserve, so that the internal combustion engine operates only in its most efficient operating range. The electric motor, which is substantially equally efficient at all operating speeds, is used to supply additional power as needed for acceleration and hill climbing, and is used to supply all power at low speeds, where the internal combustion engine is particularly inefficient, e.g., in traffic.

Figure 3:
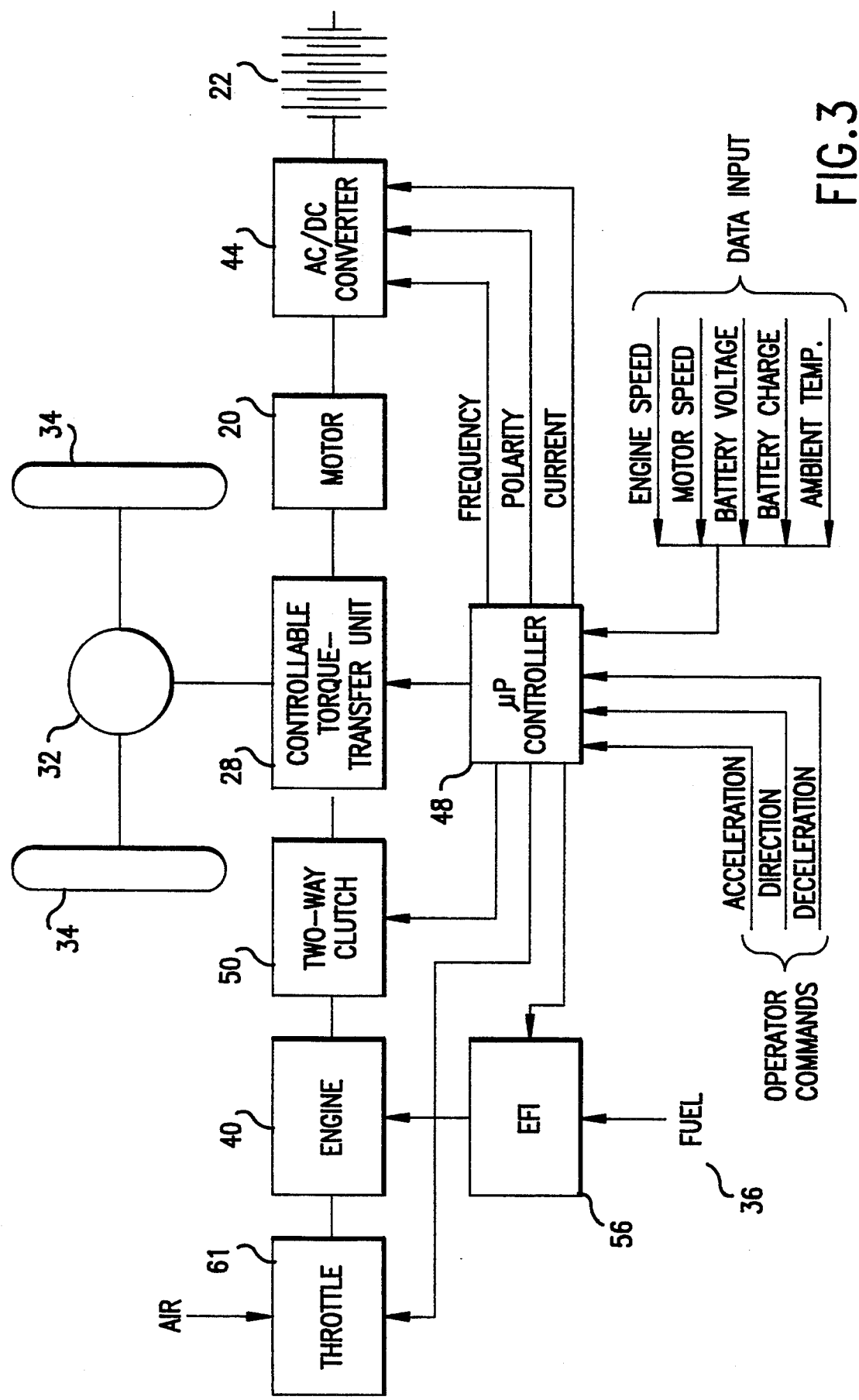
FIG. 3 is a block diagram of the parallel hybrid drive system of the invention.

FIG. 3 shows a block diagram of the drive system of the vehicle according to the invention. Internal combustion engine 40 is connected by way of a two-way clutch 50 to a controllable torque transfer unit 28. The torque transfer unit 28 receives torque from engine 40 and/or from alternating current electric motor 20 and transmits this torque to the drive wheels 34 of the vehicle by way of a conventional differential 32. The motor 20 receives power from a bi-directional AC/DC power converter 44 comprising a solid-state switching network connected in turn to a battery 22. The battery 22 is charged by power generated by the motor 20 when operated as a generator, that is, when driven by the engine 40 by way of the controllable torque transfer unit 28, or in a regenerative braking mode. A microprocessor controller 48 controls the rate of supply of fuel to engine 40 as indicated at 56, controls the opening of a throttle 61 by which the engine 40 receives intake air from the atmosphere for combusting the fuel, controls the operation of the two-way clutch 50, controls the operation of the torque transfer unit 28, and controls bi-directional flow of power between the battery 22 and the motor 20 through frequency, current, and polarity signals passed to the bi-directional AC/DC power converter 44. The microprocessor 48 receives control inputs from the vehicle operator, namely acceleration, reverse, and deceleration or braking commands, and receives data from sensors monitoring various elements of the system, including data responsive at least to engine speed, motor speed, battery voltage, battery charging status, and ambient temperature input. Other input data may be provided as required. The microprocessor also controls operation of the power converter 44 by way of frequency, current and polarity signals.

As shown in FIG. 3, both the engine 40 and the motor 20 provide torque to the drive wheels 34 by way of the controllable torque transfer unit 28. As will be detailed below, the microprocessor 48 controls the flow of torque between the motor 20, the engine 40, and the wheels 34 responsive to the mode of operation of the vehicle. For example, when the vehicle is cruising along the highway, all torque is preferably supplied from the engine 40. However, when the vehicle starts down a hill, and the operator lifts his foot from the accelerator pedal, the kinetic energy of the vehicle and the engine's excess torque may be used to drive the motor 20 as a generator so as to charge the batteries. If the vehicle then starts to climb a hill, the motor 20 is used to supplement the output torque of engine 40. Similarly, the motor 20 can be used to start the engine 40, e.g., when accelerating in traffic or the like. The various modes of operation of the system will be described below in connection with FIGS. 4–9, after which further details of the various elements of the system are provided.

FIGS. 4–9 are schematic illustrations of the operation of the parallel hybrid vehicle of the invention overcoming the deficiencies of the prior art, each depicting operation of the vehicle under various circumstances. In each of FIGS. 4–9, flow of potential energy—either electrical energy, or combustible fuel—is shown in dot-dash lines, while flow of mechanical energy, that is, torque, is shown by dashed lines.

Figure 4:
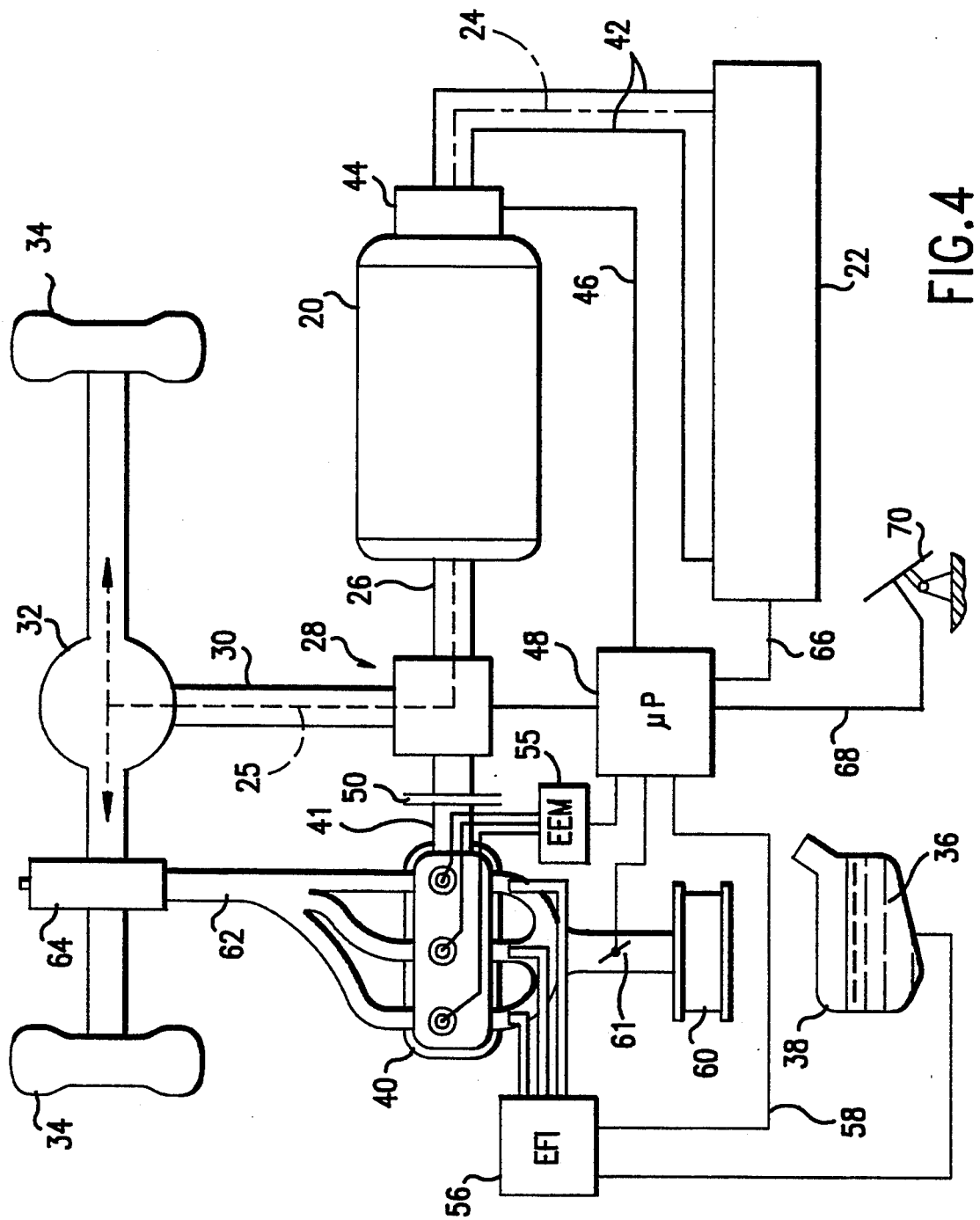

FIG. 4 illustrates operation in low speed circumstances, e.g., in city traffic or reversing. As noted, the parallel hybrid vehicle drive system according to the present invention includes an electric motor 20 powered by energy stored in a relatively large, high voltage battery pack 22. Energy flows from battery 22 to motor 20 as indicated by a dot-dash line shown at 24. The electric motor 20 provides torque, shown as a dashed line 25, transmitted from the motor output shaft 26 through a torque transfer unit 28 and a drive shaft 30 to a conventional differential 32 and then to wheels 34 of the vehicle. Thus FIG. 4 indicates that the flow of energy in heavy traffic or for reversing is simply from battery 22 to electric motor 20; torque flows from the motor 20 to the wheels 34. Under these circumstances, electric motor 20 provides all of the torque needed to move the vehicle. Other combinations of torque and energy flow required under other circumstances are detailed below in connection with FIGS. 5-9. For example, if the operator continues to command acceleration, an acceleration/hill climbing mode illustrated in FIG. 6 may be entered, followed by a highway cruising mode illustrated in FIG. 5.

Referring to some of the details of the overall system shown in FIG. 4, battery 22 is a series-connected battery pack made up of conventional lead acid batteries, or, preferably, bipolar electrode lead acid batteries. Battery 22 is capable of delivering between about 30 and about 50 amperes, and possibly up to 75 amperes. The voltage of the battery pack varies with the weight of the vehicle. For example, the preferred maximum working parameters for a typical 3,300 pound vehicle are about 1200 volts at about 50 amperes. Lighter vehicles according to the invention are preferably operated at lower voltages and similar currents, for reasons of manufacturing convenience and to allow reduction in the number of batteries required. Limiting the current to no greater than 50 amperes allows relatively inexpensive and readily assembled plug-in connectors to be used in lieu of bolted connections required where higher currents are involved, and allows some of the circuitry to be provided in printed circuit form, for manufacturing economy and convenience.

A typical battery pack for a 3,300 pound vehicle will comprise 400-500 pounds of conventional lead-acid batteries. In supply of current to a preferred motor 20 as detailed below, the battery pack will discharge by 40% in 3 minutes in driving the 3,300 pound vehicle up an 8% grade at 62 mph, assisted by a 45 hp engine. This represents entirely adequate performance on a very steep climb. Similar performance can be expected from a 200-250 pound bipolar electrode lead-acid battery pack. High energy capacitors may also be employed for energy storage in the system of the invention.

Energy is supplied from battery 22 by cables 42 to a solid-state switching AC/DC power converter unit 44 preferably comprising six MOS controlled thyristors (MCTs) (see FIGS. 12 and 13) operated responsive to control signals provided along line 46 by microprocessor 48 to convert DC current provided by battery 22 to AC current of appropriate frequency, wave shape and amplitude to operate AC induction motor 20. Such MCTs are solid state switching devices rated at, for example, 2500 volts at 100 amperes; other solid state switching elements having similar capabilities may be employed as suitable. Switching unit 44 also rectifies AC generated by motor 20 when operated as a regenerative brake or generator to charge battery 22 with rectified DC.

The output torque from motor 20 is transmitted by way of torque transfer unit 28 through a conventional differential 32 to the vehicle drive wheels 34, which may be the front or the rear wheels of the vehicle, or all four wheels. An exemplary embodiment of the controllable torque transfer unit 28 is detailed in FIG. 11. A clutch 50 may be provided between engine 40 and torque transfer unit 28, as discussed in connection with FIG. 3. In essence, controllable torque transfer unit 28 is controlled by microprocessor 48 to direct flow of torque between motor 20, engine 40, and wheels 34, as required in each operational mode of the vehicle. For example, in the power flow diagram of FIG. 4, showing operation in a heavy traffic/reversing mode, power is transmitted directly from output shaft 26 of motor 20 to drive shaft 30.

Figure 14:
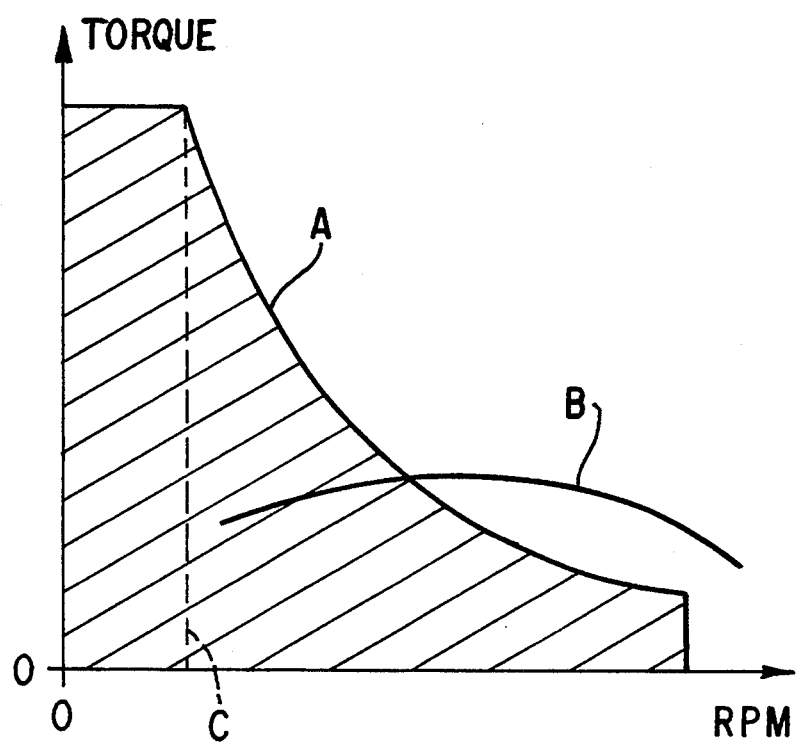
FIG. 14 illustrates the preferred torque versus speed characteristics of the motor as operated with the corresponding preferred AC/DC power converter, and of the internal combustion engine.

The engine 40 may be any of a number of types, including two or four stroke, Wankel-cycle, turbine, or more exotic types. Chemical energy is supplied to engine 40 in the form of combustible fuel 36, which may be gasoline, diesel fuel, methanol, ethanol, natural gas, propane, mixtures thereof, or other fuels. To allow engine 40 to be connected to wheels 34 without a variable-speed transmission while being operable over a wide range of road speeds, engine and engine 40 has a relatively "flat" output torque versus RPM characteristic—that is, engine 40 produces substantial torque over a wide RPM operating range. See FIG. 14.

To lower the toxic hydrocarbon and carbon monoxide emissions from combustion, the engine 40 will be operated in lean burn mode (that is, air will be supplied slightly in excess of the amount required for stoichiometric combustion) to achieve complete combustion. To lower nitrogen oxide emissions, the engine will be operated at a lower temperature and thus at slightly reduced thermodynamic efficiency (e.g., 2-3% lower) than is a conventional engine. Only 2 or 3 cylinders will be used in this engine to maintain a high volume-to-surface area ratio within its cylinders, in order to further reduce toxic emissions. That is, because the cylinder walls of any internal combustion engine are cool in comparison with the rest of the combustion chamber, the fuel does not burn as completely along the cylinder walls as elsewhere. Therefore, because an engine of given displacement having fewer cylinders will have a higher ratio of cylinder volume to cylinder surface area, it will emit proportionately lesser quantities of unburned hydrocarbons than one having more cylinders.

At present it is preferred that engine 40 be a gasoline-fueled, spark-ignition, water-cooled three-cylinder four-stroke overhead cam unit of between about 750 cc and one liter capacity producing between forty and sixty peak horsepower at on the order of 6000 RPM. Such an engine can be manufactured using conventional technology, and may be fuel injected or carbureted. However, electronic fuel injection (EFI) is preferred, as indicated at 56, because EFI is readily controlled by control signals received over a line 58 from microprocessor 48. Similarly, the ignition of internal combustion engine 40 may be controlled by an electronic engine management system (EEM) 55 controlled by or integrated with microprocessor 48. The internal combustion engine 40 receives intake air via an air filter 60; the microprocessor 48 may control the amount of air admitted by way of throttle 61, or may measure the amount of air admitted, as in certain conventional EFI systems. Internal combustion engine 40 exhausts burnt gases via a tail pipe 62 and muffler 64. These and other features not discussed in detail may be implemented as conventional in the art.

In addition to controlling the generation of appropriate AC drive pulses via control signals provided to switching unit 44, and controlling electronic engine management system 55 and electronic fuel injection 56, microprocessor 48 also monitors the level of charge of batteries 22 via a line 66 and responds to operator commands received over a control line 68 from operator control input devices, shown schematically as a pedal 70. Thus, as discussed in connection with FIG. 3, microprocessor 48 is provided with all information relevant to the performance of the system, and appropriately controls torque transfer unit 28, internal combustion engine 40, switching unit 28, and electric motor 20 to ensure that appropriate torque is delivered to the wheels 34 of the vehicle.

Control of switching unit 44 to appropriately operate motor 20 is within the present skill of the art. For example, numerically controlled machine tools employ microprocessor-controlled synchronous AC motors to provide very precise rotational speeds for accurate control of complex motions. Such precise motor control is not required for practice of the present invention, nor is a synchronous motor required. As the driver's input is an integral element of the system, the driver can make any fine adjustments required simply by varying the pressure exerted on the control input devices 70. Thus, the operator becomes an active feedback element in the control system.

The operator input devices 70 may include accelerator and brake pedals, directional control switches, and the like. Pressure on the accelerator pedal indicates to the microprocessor that more power is required; pressure on the brake causes the microprocessor to initiate regenerative braking, as discussed below. The operator may also be provided with additional input controls, for example, to prevent the microprocessor from shutting off internal combustion engine 40 during braking when the operator anticipates a need for full power. However, in general it is an object of the invention to provide a hybrid vehicle that is "user-transparent", that is, requiring no more operator knowledge or training than does a conventional automobile.

A multipole AC induction motor 20 is preferred over a DC motor due to the well known preferable torque versus speed characteristics of AC induction motors in combination with an appropriate power converter. While both AC and DC motors produce their maximum torque at zero RPM, essential in starting a heavy load from rest without a clutch, the output torque from a DC motor drops linearly with RPM. As shown by curve A of FIG. 14, a multipole AC induction motor provided with drive pulses of the proper type (readily provided by microprocessor 48 controlling switching unit 44) provides constant output torque up to a particular RPM level, e.g., point C in FIG. 14, then hyperbolically decreasing torque while providing constant output power. This torque characteristic is ideal for vehicle propulsion, particularly at low speeds. For example, point C may correspond to a 120 Hz frequency of the AC voltage signal provided by switching unit 44 (see FIGS. 12 and 13) with maximum motor RPM reached at an AC frequency of up to 1000 Hz; more preferably, point C corresponds to a minimum 150 Hz AC frequency, and maximum motor RPM to a maximum AC frequency of 600 Hz. The desired constant-torque characteristics of the output of motor 20 are provided below point C by appropriately shaping the AC drive pulses in known manner. An AC induction motor can readily be operated in reverse, that is, as a generator, simply by controlling the sequence of connection of the phase windings across the DC battery connection. See FIGS. 12-13. By comparison, the torque output by engine 40 is substantially constant over its useful working RPM range, as shown by curve B of FIG. 14. Engine 40 thus provides adequate torque for highway cruising over a wide range of vehicle speeds without the necessity of a multi-speed transmission.

Figure 5:
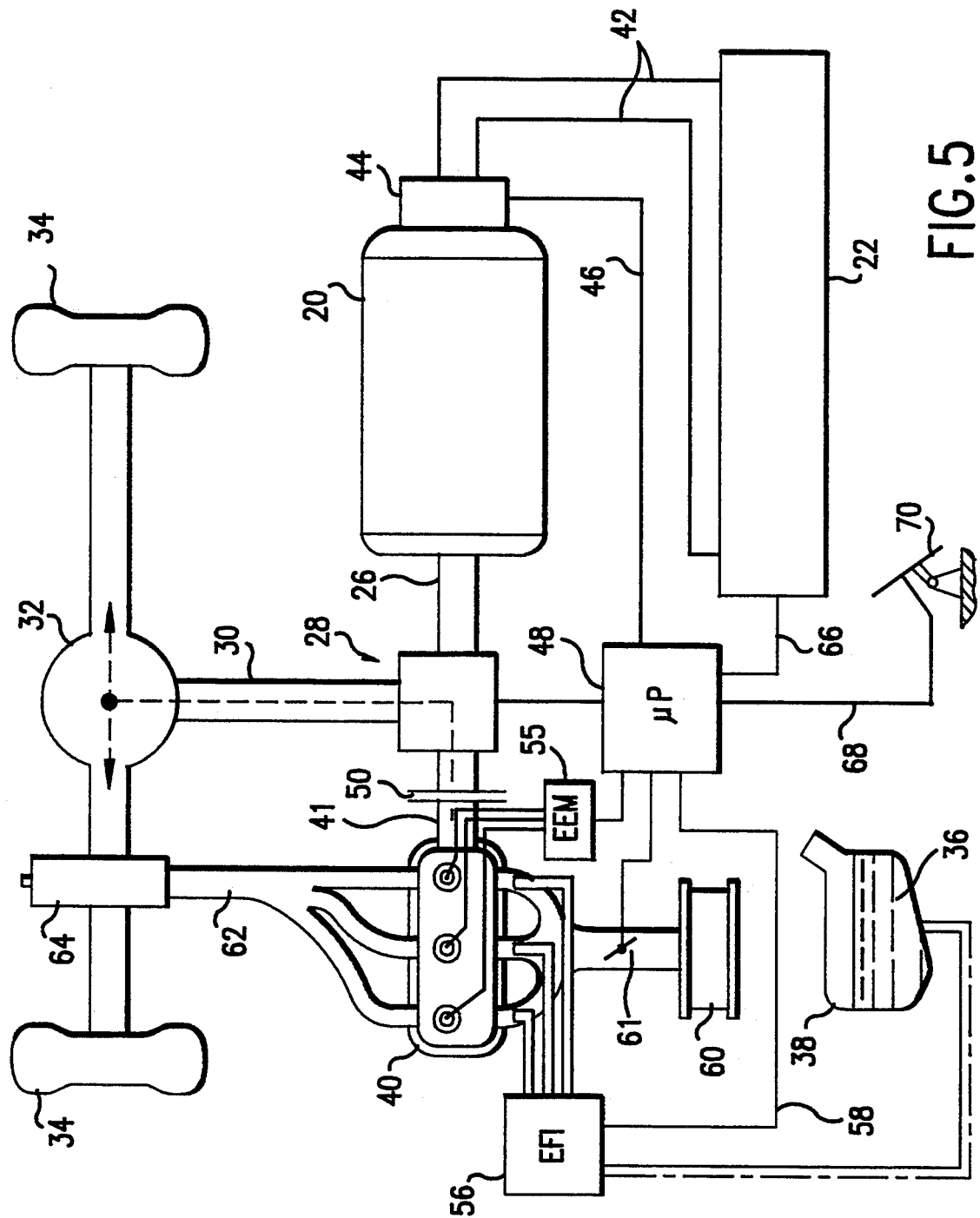

FIGS. 5-9 show operation of the system in other modes. FIG. 5 depicts operation of the system in a highway cruising mode wherein, as indicated above, all torque required to drive the vehicle at normal highway speeds (e.g. above about 45 mph) is provided by the internal combustion engine 40 supplied with combustible fuel 36 via EFI unit 56. Thus, energy flow as indicated by the dot-dash line is from the tank 38 through EFI unit 56 into engine 40, while torque flows from engine 40 through torque transfer unit 28, to axle differential 32 and thence to road wheels 34. The engine 40 is coupled to the wheels at a fixed ratio, that is, there is no variable-ratio transmission. As the desired cruising speed may vary somewhat, and as the engine output power required to attain and maintain a given road speed will vary with prevailing wind conditions, road grading and the like, the output torque of internal combustion engine 40 may be directly variable responsive to the operator's control inputs. Microprocessor 48 monitors the operator's inputs and the vehicle's performance, and activates electric motor 20 when torque in excess of the capabilities of engine 40 is required. Conversely, if excess engine torque is available (see the discussion of FIG. 7 below) it can be transformed into electrical energy in motor 20 and stored by battery 22.

Figure 6:
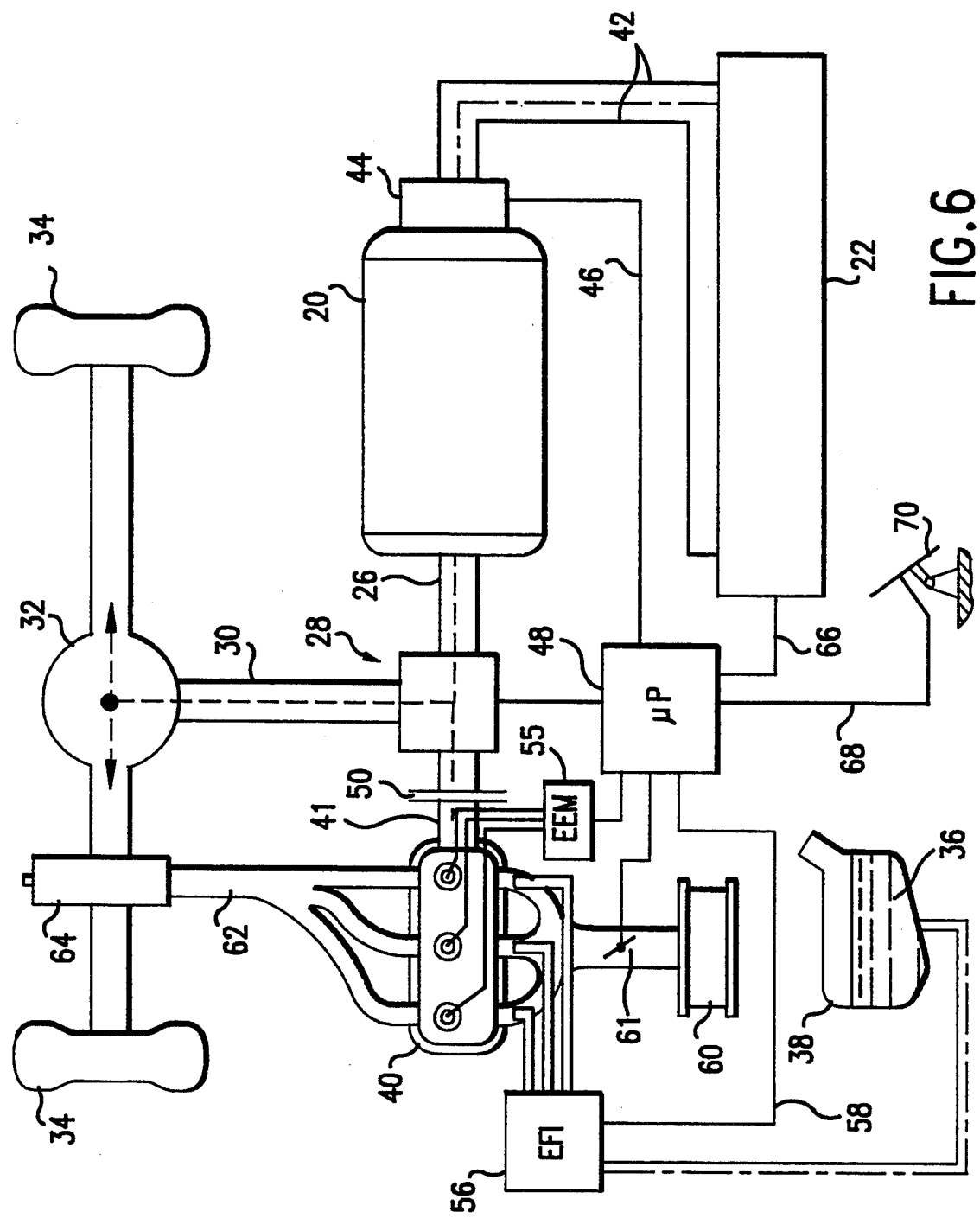

FIG. 6 illustrates operation of the system in a high-speed acceleration and/or hill climbing mode, wherein both internal combustion engine 40 and electric motor 20 provide torque to road wheels 34. Accordingly, electrical energy, as shown by the dot-dash line, flows from battery 22 to motor 20; additionally, gasoline or another combustible fuel flows from tank 38 to EFI unit 56 so that both internal combustion engine 40 and electric motor 20 can supply torque indicated by the dashed lines to road wheels 34. Again, microprocessor 48 controls operation of both motor 20 and internal combustion engine 40 through switching unit 44 and EFI unit 56, respectively. Low-speed acceleration—up to about 25 mph—is powered by the motor 20 alone.

Figure 7:
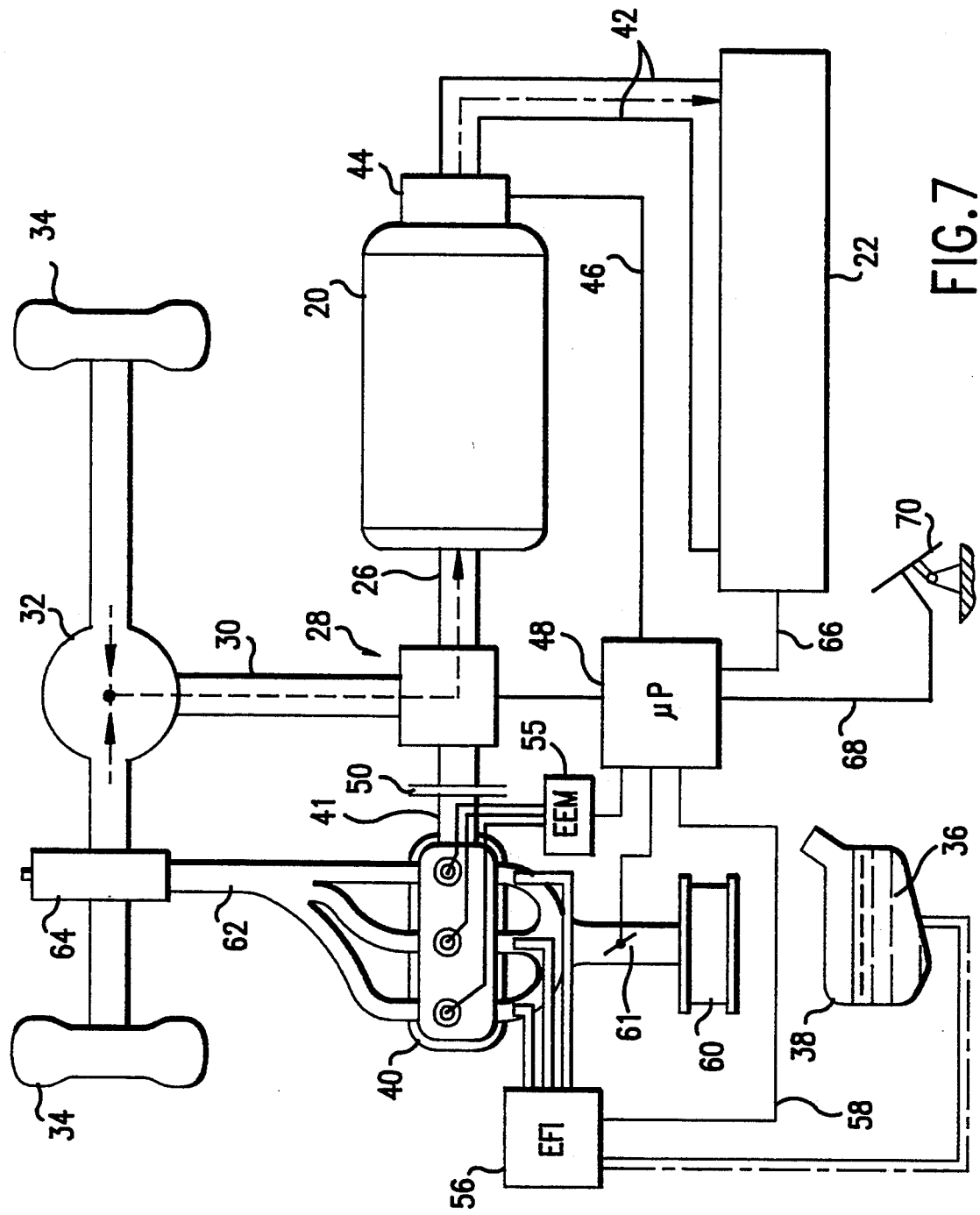

FIG. 7 depicts operation of the system in a regenerative braking or coasting mode, wherein electrical energy is generated by motor 20, rectified in switching unit 44 and fed back to charge batteries 22, as indicated by the position of the arrow head on the dot-dash line connecting switching unit 44 to batteries 22. Under the control of microprocessor 48, the regenerative braking-/coasting mode can be entered whenever the driver removes his foot from an accelerator pedal and depresses a brake pedal, both indicated schematically at 70, or on downhill stretches. In this mode the kinetic energy of the vehicle is fed back from road wheels 34 and differential 32 via drive shaft 30 to torque transfer unit 28 to electric motor 20; microprocessor 48 controls appropriate operation of switching unit 44 (see FIGS. 12 and 13) to generate rectified DC for storage in battery 22 from AC provided by motor 20.

Figure 8:
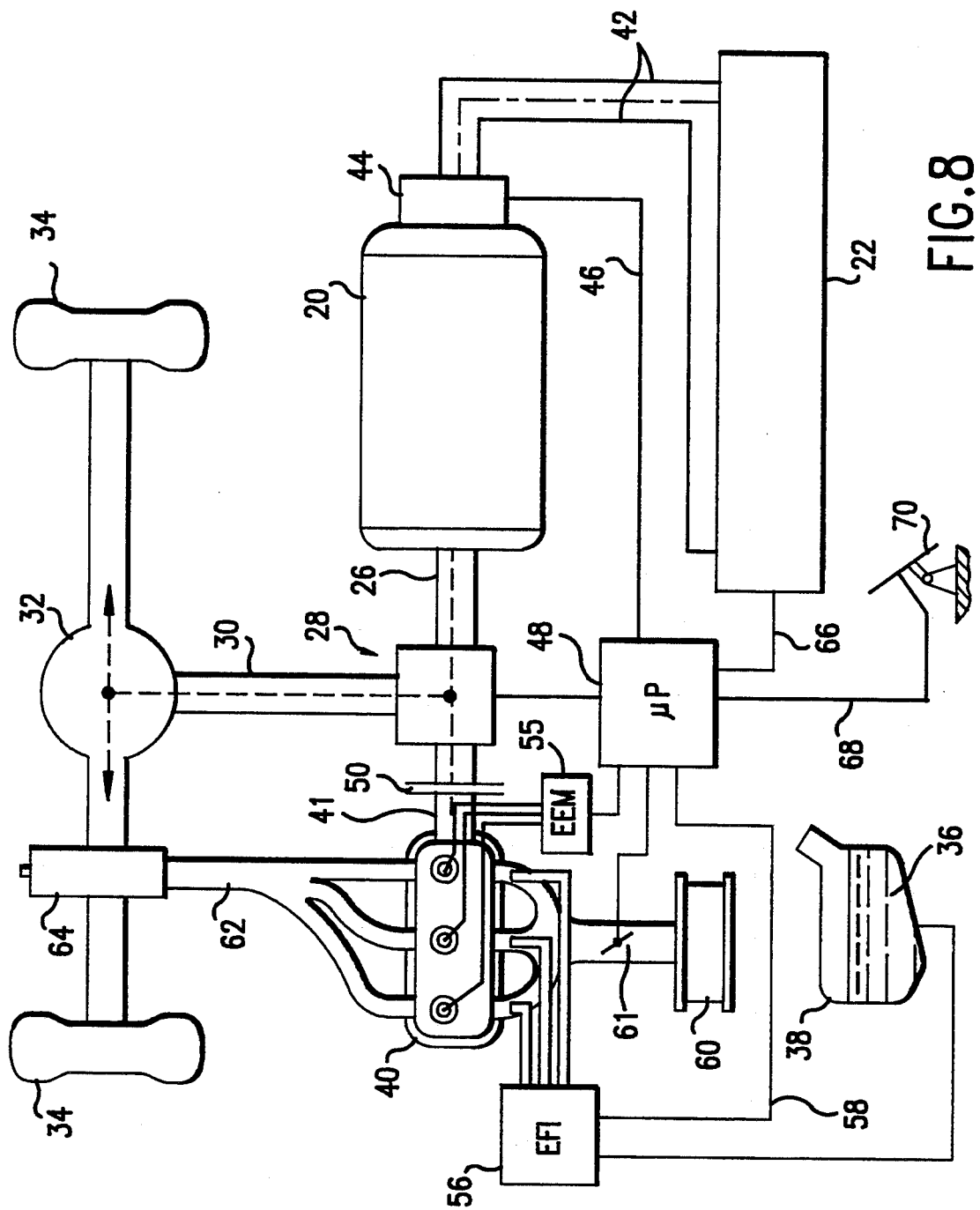

FIG. 8 illustrates operation of the system during starting, that is, when electric motor 20 starts internal combustion engine 40 from rest. In this case energy flows from battery 22 to switching unit 44, and output torque is supplied by output shaft 26 of motor 20. Since internal combustion engine 40 will typically be started when the vehicle is already under power, e.g., in heavy traffic that requires occasional acceleration, motor 20 simultaneously supplies torque to internal combustion engine 40 for starting it and also to driveshaft 30 to propel the vehicle forward. The fact that microprocessor 48 controls throttle 61, EFI unit 56 and EEM unit 55 ensures quick, smooth starting. When engine 40 has started, microprocessor 48 shifts vehicle operation to the mode of FIG. 6.

Finally, FIG. 9 illustrates system operation in the battery charging mode. Battery charging takes place automatically, under microprocessor control, responsive to monitoring the state of charge of battery 22 via control signal line 66. Internal combustion engine 40 charges battery 22 by rotating motor 20, providing AC rectified by switching unit 44 to DC suitable for charging battery 22. If this mode is entered during driving, internal combustion engine 40 also supplies torque to road wheels 34, as indicated by the dashed lines.

Figure 11:
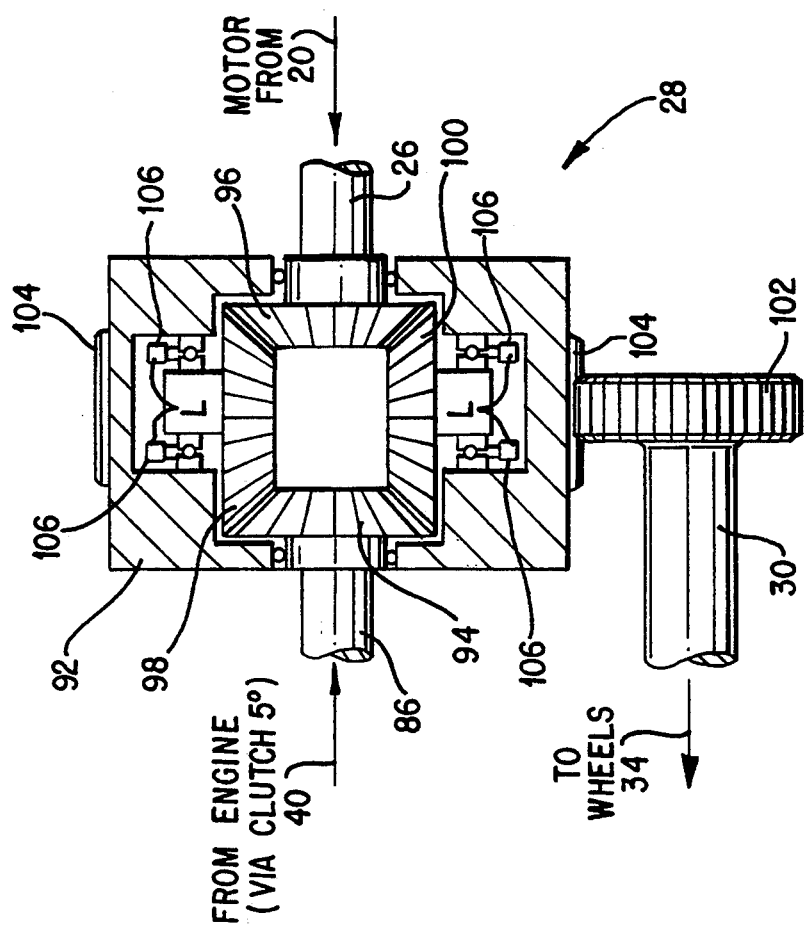
FIG. 11 is a schematic cross-sectional view of the torque transfer unit.
Figure 10:
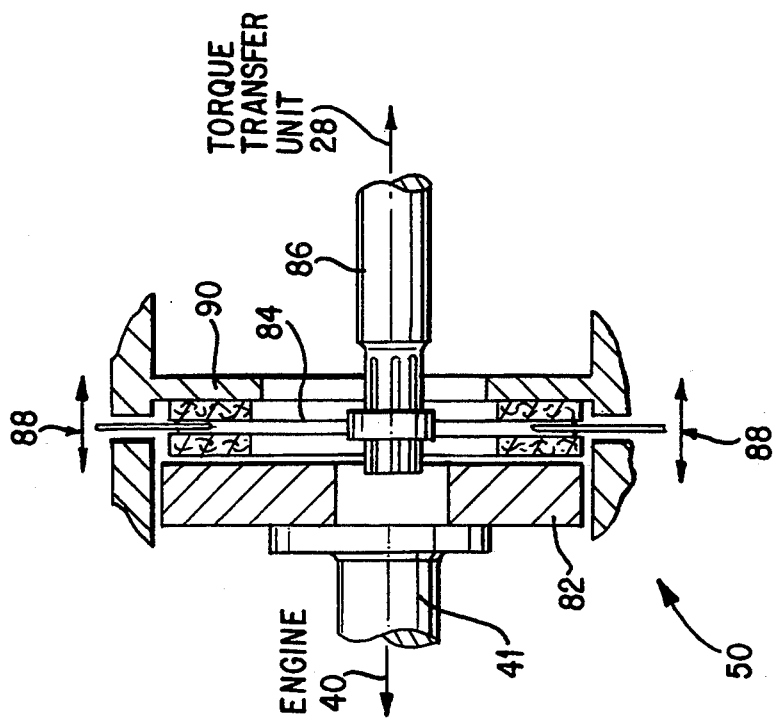
FIG. 10 is a schematic cross-sectional view of a clutch forming a frictional coupling between one input shaft of a torque transfer unit and either the internal combustion engine or the frame of the vehicle.

FIGS. 10 and 11 show respectively a two-way clutch 50 employed to couple the internal combustion engine 40 to the drive train of the vehicle, and the controllable torque transfer unit 28. It will be appreciated that the disclosed embodiments of these and other elements of the vehicle of the invention are exemplary only, and that other devices performing equivalent functions are known to the art and are considered to be within the scope of the invention.

The two-way clutch 50 shown in FIG. 10 receives torque from an engine flywheel 82 fixed to the engine output shaft 41, and includes a double-sided friction disk 84 splined onto an input shaft 86 of the controllable torque transfer unit 28. A throwout mechanism 88 controlled by microprocessor 48 controls engagement of the friction disk 84 with either the flywheel 82 or a stationary plate 90 fixed with respect to the vehicle. Therefore, depending upon the position of the friction disk 84, torque may be transmitted from engine shaft 41 to input shaft 86, or input shaft 86 can be fixed with respect to the vehicle, for reasons made clear below.

FIG. 11 shows one embodiment of the controllable torque transfer unit 28. Again, numerous functionally equivalent devices are known to the art, and are within the scope of the invention. The controllable torque transfer unit 28 comprises four constantly-meshing bevel gears 94, 96, 98 and 100. A first bevel gear 94 is fixed to the input shaft 86 for receiving torque from the engine 40 via clutch 50 (FIG. 10). The second bevel gear 96 is fixed to the motor shaft 26 for receiving torque from the electric motor 20. Bevel gears 94 and 96 are journaled for free rotation about an axis of housing 92. When housing 92 rotates about its axis, torque is transmitted from housing 92 to wheels 34 by drive shaft 30, as indicated schematically by pinion 102 on drive shaft 30 mating with teeth 104 formed on the outer circumference of housing 92. The third and fourth bevel gears 98 and 100 respectively are journaled for rotation in bores in housing 92, and have their axes lying in a plane perpendicular to the axis of housing 92. Locking devices indicated schematically at 106 are provided for control of the rotation of gears 98 and 100 with respect to housing 92. Thus, gears 98 and 100 may be locked with respect to housing 92, or may rotate freely with respect to housing 92. In a preferred embodiment of torque transfer unit 28, locking devices 106 are further controllable to provide substantial torque transfer between gears 98 and 100 and housing 92. Accordingly, rotation of gears 98 and 100 may take place in a "limited-slip" manner, discussed below. The operation of locking devices 106 and accordingly the rotation of gears 98 and 100 with respect to the housing 92 is controlled by microprocessor 48.

When gears 98 and 100 are fixed with respect to housing 92, the torque transfer unit 28 is said to be "locked" or in the "parallel" mode of operation. In this mode, with clutch 50 operated such that engine output shaft 41 is engaged with input shaft 86, both shafts 86 and 26 rotate at the same rate, and the sum of the input torque provided from engine 40 and motor 20 is transferred to wheels 34 by drive shaft 30.

If it is desired to engage only motor shaft 26 with drive shaft 30, clutch 50 can be operated to decouple input shaft 86 from engine output shaft 41 and lock input shaft 86 to stationary disk 90. In this circumstance, with gears 98 and 100 fixed with respect to housing 92, torque is transmitted directly from input shaft 26 to driveshaft 30.

When gears 98 and 100 are free to rotate within housing 92, the torque transfer unit is said to be operated in a "differential" mode. In this mode, torque from engine 40 may be transferred, for example, to motor 20 operated as a generator to charge battery 22, and also to driveshaft 30, to propel the vehicle forward. More specifically, in the differential mode, if the engine and motor shafts rotate in opposite directions at the same speed, the housing 92 will be stationary. If the speeds of input shafts 86 and 26 differ, torque transferred to housing 92 by spur gears 98 and 100 will cause the housing 92 to rotate at a differential speed. If gears 94, 96, 98 and 100 have equal numbers of teeth, the differential speed at which housing 92 rotates is equal to the difference in speeds of shafts 94 and 96. Equal amounts of torque are transmitted by each shaft, while the flow of power is proportional to the speeds of the corresponding shafts.

By comparison, in the parallel mode, when the planetary gears 98 and 100 are locked with respect to housing 92, housing 92 rotates at the speed of the engine shaft and/or the motor shaft, depending on the operation of clutch 50. The torque transmitted by the housing 92 to pinion 102 is the sum of the torques provided by motor 20 and engine 40 to input shafts 26 and 86 respectively.

As noted, pinions 98 and 100 may be locked to housing 92 by locking devices shown schematically at 106. Devices 106 may comprise magnetic or friction clutches for controllably locking gears 98 and 100 to housing 92. Devices 106 are operated by microprocessor 48 so that microprocessor 48 can control the torque transfer unit 28 in accordance with the selected operational mode of the vehicle of the invention.

In a further preferred embodiment, locking devices 106 may provide a fixed or variable amount of slip between gears 98 and 100 and housing 92, whereupon torque transfer unit 28 is said to be operated in a "limited-slip" or "limited-slip differential" mode. In this mode of operation, while gears 98 and 100 rotate with respect to housing 92, their rotation is not free. For example, a fraction of the torque imparted to gears 98 and 100 from input shaft 41 may be transferred to housing 92 by frictional engagement (for example) of locking devices 106. This fraction of the total torque drives the vehicle forward; the remainder is transferred to motor 20 and is employed to charge the battery. Thus, in the limited-slip mode of operation of torque transfer unit 28, the rotational speed of housing 92 is not an algebraic sum of the speeds of shafts 26 and 86 (as in the cases of the parallel and differential modes of operation of torque transfer unit 28), but is controlled responsive to the amount of slip provided by locking devices 106. The amount of slip may be controlled by the microprocessor, or may be fixed. By thus providing a controlled amount of slip between the gears 98 and 100 and housing 92, the flow of torque between engine 40, motor 20 and output shaft 30 may be precisely controlled.

More specifically, on occasion it will be desired to charge the batteries while driving the vehicle forward, e.g. in slow traffic. In this mode, the engine output power is divided in order to propel the vehicle forward and to charge the batteries. Locking devices 106 allow differential operation of the gears within the housing 92 and therefore allow the power output by the engine to be divided as determined to be appropriate by microprocessor 48. Furthermore, by controlling the duty cycle and frequency of operation of the switching elements of controller 44 (see FIGS. 12 and 13), the load provided by the motor to the engine can be controlled. Thus, at all times the microprocessor 48 may determine the load ( if any) to be provided to the engine by the motor, responsive to the load imposed by the vehicle's propulsion requirements, so that the engine 40 can be operated in its most fuel efficient operating range.

Summarizing, it will be recalled that according to an important object of the invention, the present hybrid electric vehicle does not employ a multi-speed transmission. Accordingly, the ratios of the rates of rotation of the engine 40 and motor 20 to those of the respective input shafts of torque transfer unit 28, and the ratio of the rates of rotation of the housing 92 and of the wheels 34, are fixed. However, it is within the scope of the invention to employ constant-ratio reduction gears, for example, between motor 20 or engine 40 and torque transfer unit 28. Further, it will be appreciated that in the differential mode of operation the ratio of the rate of rotation of housing 92 to the difference between the rates of rotation of the input shafts is fixed; in the limited-slip differential mode of operation, this latter ratio may alternatively be controlled to assume a second fixed value, or may be variable under microprocessor control.

In further explanation of the operation of the vehicle of the invention, there are typically two modes of operation at slow speed, that is, at up to about 25-35 mph, depending on the state of charge of the battery 22. Because the engine 40 is cycled on and off in this speed range when the average power demand is small, in one mode the system is operated as a pure electric drive system (as in FIG. 4) and in the other mode it is operated as a differential drive system.

When the battery 22 is fully charged, and the vehicle speed is below about 25-35 mph, the microprocessor 48 disconnects the engine 40 from the drive and shuts it off. Under these circumstances only the motor 20 provides power to drive the vehicle. If the brake pedal is depressed by the driver, the microprocessor 48 causes the motor frequency to advance, so that motor 20 performs as a generator to recover some of the braking energy back into the battery. See FIGS. 12-13. Up to 40-50% on average of the vehicle's kinetic energy may thus be recovered and stored in battery 22. Excess braking energy is still dissipated by the brake pads of the vehicle.

By comparison, if the battery is discharged by 10-20% and the vehicle speed is below 25-35 mph, the microprocessor 48 actuates the two-way clutch 50 (see FIG. 10) to connect the engine 40 to the torque transfer unit. Then the motor 20 will start the engine 40 while driving the vehicle, with the microprocessor 48 providing optimal starting conditions as above. Locking devices 106 are released, such that the torque transfer unit 28 operates in differential mode. The microprocessor 48 then controls the speeds of both the engine 40 and the motor 20 such that the difference in speed of their output shafts is equal to the speed required by the driver for vehicle propulsion. As noted, engine speed is controlled such that engine 40 provides 60-90% of its maximum power over a wide range of vehicle speeds. Excess power is used to recharge the battery 22. The microprocessor 48 controls the switching network 44 so that the motor 20 acts as a generator to charge the battery. See FIGS. 12-13. The microprocessor 48 monitors the state of battery charge and terminates this mode of driving when the battery is fully recharged.

According to a preferred implementation of the invention, microprocessor 48 monitors the state of charge of batteries 22 via line 66 and recharges the batteries whenever the charge is depleted by more than about 10-20%. Such frequent light charges result in improved battery life as compared to regularly allowing the batteries to be nearly fully discharged, followed by a lengthy recharge period, as is necessary in operation of entirely electric vehicles. Under conditions of maximum battery usage, e.g., in heavy traffic, the duty cycle of the internal combustion engine for battery charging is 10-20%; that is, in traffic, internal combustion engine 40 charges the battery perhaps once per hour for a period of approximately twelve minutes.

It is within the scope of the invention to operate the engine 40 outside its most fuel efficient operating range, on occasion. For example, if the torque transfer unit does not provide a limited-slip mode of operation the combined load of low-speed vehicle operation in traffic together with battery charging may be less then the minimum power produced by the engine in its most efficient operating range. In these circumstances, it is preferable to use the engine somewhat inefficiently rather than to discharge the batteries excessively, which would substantially reduce the battery lifetime.

At moderate speeds, as experienced in suburban driving, the speed of the vehicle on average is between 30-45 mph. The vehicle will operate in a highway mode with the engine running constantly after the vehicle reaches a speed of 30-35 mph. The engine will continue to run unless the engine speed is reduced to 20-25 mph for a period of time, typically 2-3 minutes. This speed-responsive hysteresis in mode switching will eliminate nuisance engine starts.

Figure 12:
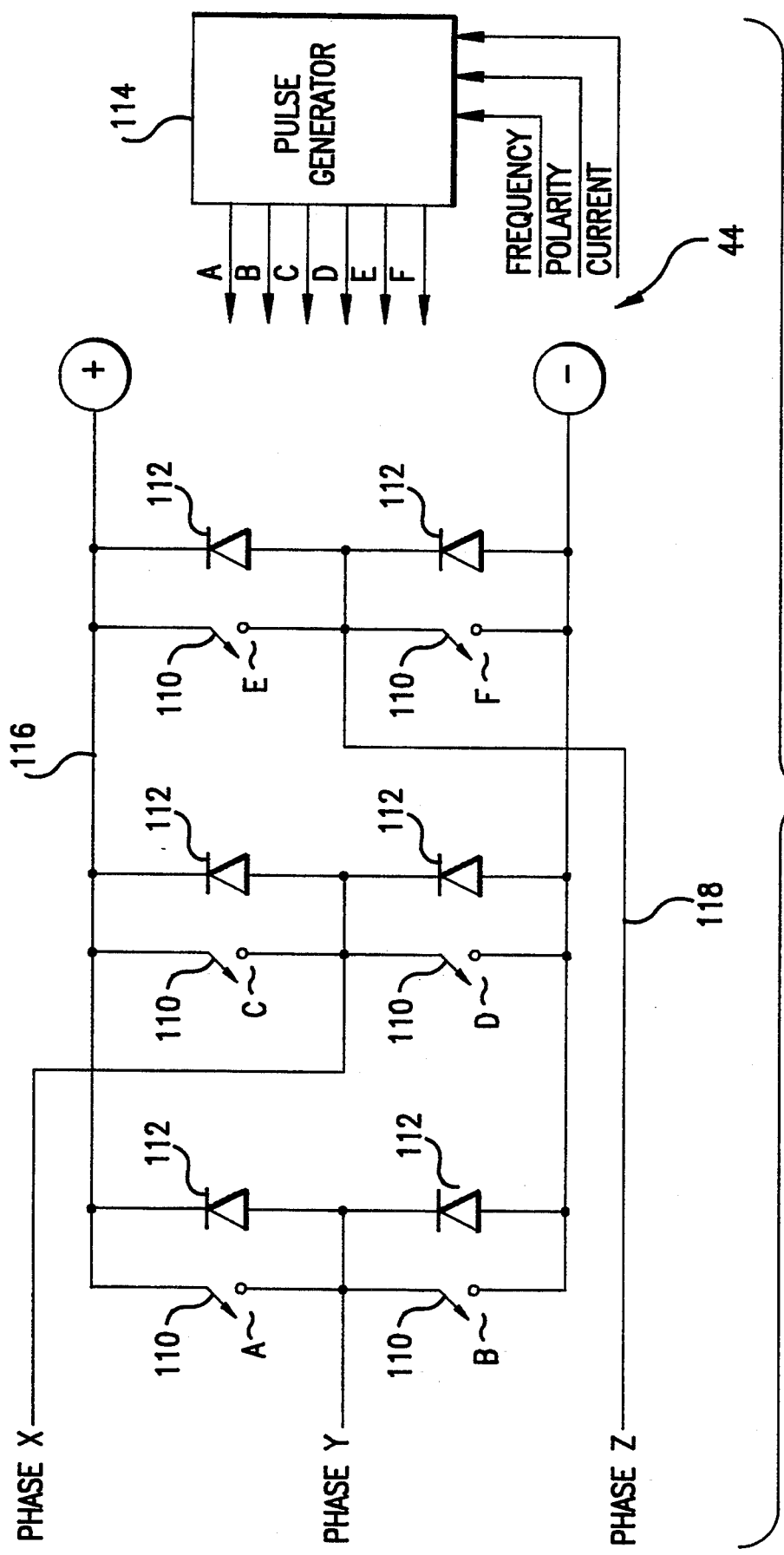
FIG. 12 is a schematic circuit diagram of the solid-state switching unit providing AC/DC power conversion, with indication of the control signals provided thereto.

FIG. 12 shows one circuit for the solid-state switching AC/DC converter/motor controller unit 44. As indicated above, the principal functions of switching controller unit 44 are to convert DC provided by batteries 22 into appropriate AC pulses for operation of motor 20, and similarly to convert AC provided by motor 20 where operated as a generator to DC for charging battery 22. The circuit illustrated in FIG. 12 for carrying out these functions is a three-phase bridge circuit comprising six solid-state devices 110 operated as switches responsive to control signals A-F. Switching devices 110 are in parallel with six flyback diodes 112. In this embodiment, motor 20 comprises three phase windings which are connected to the lines marked Phases X, Y and Z. Positive and negative bus lines 116 and 118 marked + and − are connected to the battery 22. The motor phases are connected to the bus lines 116 and 118 by solid-state switches 110 at appropriate times by signals A-F. In the embodiment of FIG. 12, signals A-F are provided by a controller 114 responsive to desired frequency, polarity and pulse width or output current signals provided by microprocessor 48. The frequency command establishes the synchronous speed of the motor, the polarity command establishes the direction of rotation, and the pulse width or current command establishes the output torque within the torque envelope shown by curve A of FIG. 14. It will be appreciated that controller 114 could also be configured as part of microprocessor 48 if convenient. Switches 110 are thus controlled responsive to the desired frequency, polarity, and current signals to connect the various phase windings of AC induction motor 20 to operate as a motor or generator.

Figure 13:
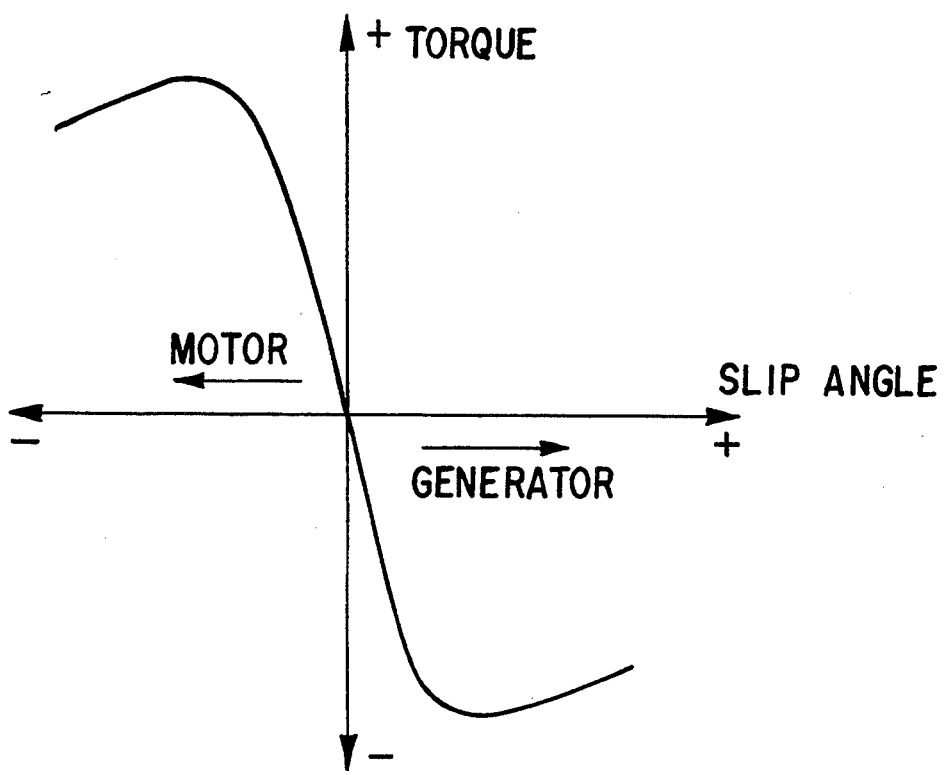
FIG. 13 illustrates the manner of control of the motor as a motor or generator.

FIG. 13 indicates that the operation of motor 20 as a motor or a generator is a function of the "slip" or "space phase" angle. The slip angle is the ratio of the difference between the loaded shaft speed and a desired synchronous speed to that synchronous speed. When the motor is unloaded the output torque is zero, and the slip angle is zero. When the motor is loaded the slip angle becomes negative and the motor generates torque, that is, acts as a power source. If the AC frequency is changed, the synchronous speed will change accordingly. If this frequency change is such that the slip angle becomes positive, the motor will produce negative torque, i.e., will act as a generator and will become a load. Therefore, by appropriately altering the AC frequency, power is generated, charging the battery. In the generating mode, net current flow is through the diodes 112 from the three phase windings to the DC battery to be charged. When the motor 20 is being operated as a torque source, in the "motoring" mode, current is transmitted from the DC input to the three phases of the motor; each of the semi-conductor switches 110 and the diodes 112 conduct during each cycle, and the net current flow is through the semi-conductor switches 110.

Several different types of semi-conductor switching devices are suitable for the switching elements 110 of the solid-state switching power converter 44; these devices include silicon controlled rectifiers (SCRs), gate turnoff thyristors (GTOs) and MOS controlled thyristors (MCTs). The preferred embodiment currently employs MCTs, with GTOs as the second choice.

As indicated above, for minimum cost and minimum losses the electrical circuits connecting the battery and the motor via the controller should operate at low current and relatively high voltage. The current should be less than 75 amperes and is preferably in the 30–50 ampere range; in the example given above of a 60–80 horsepower motor operating at 50 amperes maximum current to power a 3,300 pound vehicle, the DC voltage will be 1,000 to 1,400 volts. Typical maximum voltages corresponding to light and heavy vehicles are between 500 and 1,500 volts. The battery capacity may also be varied in accordance with the intended use of the vehicle; for example, vehicles sold for intended use in flat terrain will normally require less battery capacity than those for use in mountainous terrain.

Having thus summarized the operation of the hybrid vehicle of the invention, certain further aspects of the invention can be discussed. FIGS. 1 and 2 indicate that an internal combustion engine 40 of about forty-five horsepower will be adequate to provide sufficient power for cruising in a 3,300 pound automobile at steady speed on the highway. The next criterion is to provide enough power for adequate acceleration and hill climbing; an electric motor 20 of about sixty-five horsepower is appropriate, so that a total of one hundred ten horsepower is available. It will be recognized of course that these figures are subject to considerable variation. However, it is considered an aspect of the invention that the maximum power of the electric motor is at least about equal and possibly up to double the maximum power of the internal combustion engine; this ratio reflects approximately the ratio of the power required for cruising and for acceleration or hill climbing.

As also indicated above, according to the invention electric motor 20 is an asynchronous AC induction motor driven by pulses provided by MOS controlled thyristors switched by microprocessor 48, or by a dedicated motor controller responsive to microprocessor 48. In a further aspect of the invention, motor 20 operates on relatively high voltage and relatively low current AC of at least about 120 Hz and up to 1000 Hz phase voltage frequency. All else being equal, such a high frequency motor can be made more compact than the typical lower frequency 60 Hz AC motor. However, higher frequencies involve increased power losses. Preferably, a multipole motor (one having at least ten poles) is employed, so that adequate power is provided at a maximum RPM selected to ensure satisfactory motor durability. As an example, an 18-pole motor 20 operating at 150–600 Hz will have a maximum speed of 4,000 rpm; this would be conveniently close to the operating speed of engine 40, so that reduction gearing need not be provided.

The advantage of operating at relatively low maximum currents of between 30 and 75 amperes and preferably no more than 50 amperes is that by thus lowering the current as compared to the high currents of prior hybrid and electric vehicles, electrical connection and circuit manufacturing technologies can be employed that will simplify the manufacture of the vehicle and render its operation most efficient. The maximum voltage is then chosen in accordance with the vehicle weight. More specifically, conductors carrying up to about 50 amperes can be connected through simple plug-in connectors as commonly used in electrical power wiring; higher currents, as taught by the prior art relating to hybrid vehicles, require bolted connections. Moreover, for a given power transmission requirement, higher voltages and lower currents result in reduced resistance heating losses as compared to lower voltages and higher currents. Further, through use of lower currents, it is possible to manufacture the circuitry connecting the solid-state switching elements of switching unit 44 and related components to the control signal conductors and power feeders using printed circuit technology. It is feasible to print wide conductors thick enough to carry 20 amperes of current as required to supply a three-phase motor with 50 total amperes of AC power, and to likewise carry rectified current produced by the motor when operated in regenerative braking mode to recharge battery 22. Preferably, switching module 44 carries the switching elements 110 on a ring-shaped printed circuit board disposed around shaft 26 of motor 20, the elements 110 being cooled by heat sinks in the flow path of a fan mounted on shaft 26 to ensure adequate cooling. If it is desired to manufacture a smaller, lighter vehicle according to the invention, the same circuit components could be used and the voltage simply reduced by reducing the number of individual batteries making up battery pack 22, providing substantial manufacturing economy.

It will be appreciated that according to the invention the internal combustion engine is run only in the near vicinity of its most efficient operational point, that is, such that it produces 60–90% of its maximum torque whenever operated. This in itself will yield improvement in fuel economy on the order of 200–300%. More specifically, a 200–300% reduction in fuel consumption will provide an equal reduction in carbon dioxide emissions, as the amount of carbon dioxide emitted is proportional to the amount of fuel used. If ethanol is used as a fuel, that is, if the fuel is derived from renewable plant life rather than fossil fuel, an overall reduction in global carbon dioxide emissions will be achieved since the plants consume carbon dioxide during growth.

Toxic pollutants such as nitrogen oxides, carbon monoxide and hydrocarbons will be reduced by 200–300% simply through use of less fuel. As indicated above, a further reduction can be obtained by operating the engine in a lean burn mode. Although reduction of the combustion temperature in order to reduce the amount of nitrogen oxides emitted also reduces the thermodynamic efficiency, this technique can still be usefully employed; the improvement in fuel efficiency realized according to the invention is so high that a slight reduction in thermodynamic efficiency resulting in the reduction of the amount of nitrogen oxides emitted can be tolerated without substantial loss in overall economy.

The following parameters are relevant to the performance of a parallel hybrid vehicle: 1) the total maximum power available to drive the vehicle; 2) the ratio of the maximum output power of the internal combustion engine versus that of the electric motor; 3) the energy capacity of the battery; 4) the function of the power converter used to convert mechanical energy to electrical energy for storage and vice versa; 5) the availability of power to recharge the battery at any time; 6) the optimization of the control algorithm; and 7) appropriate mechanical linkage between the engine, the motor, and the drive wheels. According to the invention, these parameters are optimized so as to ensure that the engine is operated at all times at its maximum point of efficiency, and such that the driver need not consider the power source being employed at any given time.

The cost of the engine according to the invention is 30–50% that of a conventional engine. The cost of the clutch and torque transfer unit is no more than 33% of the cost of a conventional automatic transmission. No alternator or starter is required. The cost of the motor, the solid state switching unit, and the increased battery capacity is roughly equivalent to the cost of the components eliminated according to the invention. Weight and manufacturing complexity are likewise comparable.

Thus, in accordance with the objects of the invention a hybrid electric vehicle is provided that is fully competitive with conventional internal combustion engine driven vehicles in terms of acceleration, cost, weight, and manufacturing and operational convenience, while obtaining very substantial improvements in fuel efficiency and even more substantial reduction in emission of pollutants.

It should be understood that while in the foregoing the best mode of practice of the invention now known to the inventor has been fully disclosed, numerous inventions and developments will be made during further development of the hybrid electric vehicle of the invention. Therefore, inasmuch as the present invention is subject to many variations, modifications, and changes in detail, it is intended that all subject matter discussed above or shown in the accompanying drawings be interpreted as illustrative only and not be taken in a limiting sense.

What is claimed is:

1. A hybrid electric vehicle, comprising:
   two or more drive wheels receiving torque for propelling said vehicle from an output shaft, and a power unit supplying drive torque to said output shaft, said power unit comprising:
   a controllable torque transfer unit adapted to receive torque from two sources via first and second input shafts and transmit said torque to said output shaft;
   an engine adapted to consume combustible fuel and supply torque to said torque transfer unit;
   an electric motor adapted to receive electricity from a battery and supply torque to said torque transfer unit, said motor also being adapted to be operated as a generator, whereupon said motor receives torque and generates electric energy;
   a battery for supply of stored electric energy to said motor, and for receiving and storing electric energy from said motor when operated as a generator; and
   a controller for controlling the operation of said engine, said electric motor, and said torque transfer unit, such that said torque transfer unit receives torque from either or both of said internal combustion engine and said electric motor via said first and second input shafts and transmits torque therefrom to said drive wheels by way of said output shaft, and for controlling the relative contributions of the internal combustion engine and electric motor to the torque driving the wheels;
   wherein the relative ratios of the rates of rotation of said engine and said electric motor to said input shafts, and the relative ratio of the rate of rotation of an output member of said torque transfer unit to the rate of rotation of said driven wheels, are fixed.

2. The vehicle of claim 1, wherein said controller means controls flow of combustible fuel to said engine and of electrical energy to said motor, whereby said vehicle may be operated in a variety of operating modes selected dependent on desired vehicle performance.

3. The vehicle of claim 2, wherein said modes include at least:
   a low speed/reversing mode, wherein all energy is supplied by said battery and all torque by said electric motor;
   a high speed/cruising mode, wherein all energy is supplied by combustible fuel and all torque by said engine; and
   an acceleration/hill climbing mode, wherein energy is supplied by both combustible fuel and said battery, and torque by both said engine and said motor.

4. The vehicle of claim 1, wherein said engine is an internal combustion engine.

5. The vehicle of claim 4, wherein said combustible fuel is selected from the group consisting of ethanol, natural gas, propane, gasoline, and diesel fuel.

6. The vehicle of claim 1, wherein said motor is an AC inductor motor.

7. A hybrid electric vehicle comprising:
   two or more drive wheels receiving torque for propelling said vehicle from an output shaft, and a power unit supplying drive torque to said output shaft, said power unit comprising:
   a controllable torque transfer unit adapted to receive torque from two sources and transfer said torque to said output shaft;
   an engine adapted to consume combustible fuel and supply torque to said torque transfer unit;

an electric motor adapted to receive electricity from a battery and supply torque to said torque transfer unit, said motor also being adapted to be operable as a generator;

a battery for supply of stored electric energy to said motor, and for receiving and storing electric energy from said motor when operated as a generator; and a controller for controlling the operation of such engine, said electric motor, and said torque transfer unit such that said torque transfer unit receives torque from either or both of said internal combustion engine and said electric motor and transmits and for controlling the relative contributions of the internal combustion engine and electric motor to the torque driving the wheels, and wherein said battery provides a maximum current of no more than about 75 amperes at a voltage selected responsive to the characteristics of said motor.

8. The vehicle of claim 7, wherein said battery provides a maximum voltage in the approximate range of 500–1,500 volts.

9. The vehicle of claim 7, wherein said electric motor is an AC motor, said vehicle further comprises solid state switching means, and said battery provides DC to said switching means, said switching means comprising means for converting said DC supplied by said battery to AC for supply to said electric motor, and further comprising means for rectifying AC generated by said motor when operated in a regenerative mode to provide DC to charge said battery.

10. The vehicle of claim 9, wherein said AC supplied by said switching means has a frequency of between about 120 and about 1000 Hz.

11. A hybrid electric vehicle, comprising:

two or more drive wheels receiving torque for propelling said vehicle from an output shaft, and a power unit supplying drive torque to said output shaft, said power unit comprising:

a controllable torque transfer unit adapted to receive torque from two sources and transfer said torque to said output shaft;

an engine adapted to consume combustible fuel and supply torque to said torque transfer unit;

an AC electric motor adapted to receive electric energy from a battery and supply torque to said torque transfer unit, said motor being further adapted to be operable as a generator;

a battery for supply of stored electric energy to said motor, and for receiving and storing electric energy from said motor when operated as a generator;

solid state switching means for converting DC supplied by said battery to AC for supply to said electric motor, and for rectifying AC generated by said motor when operated in a regenerative mode to provide DC to charge said battery; and a controller for controlling the operation of said engine, said electric motor, said solid state switching means, and said torque transfer unit, such that said torque transfer unit receives torque from either or both of said internal combustion engine and said electric motor and transmits torque therefrom to said drive wheels by way of said output shaft, and for controlling the relative contributions of the internal combustion engine and electric motor to the torque driving the wheels.

12. The vehicle of claim 11, wherein said solid state switching means comprises a plurality of metal oxide semiconductor controlled thyristors switched responsive to control signals provided by said controller.

13. A hybrid electric vehicle, comprising:

two or more drive wheels receiving torque for propelling said vehicle from an output shaft, and a power unit supplying drive torque to said output shaft, said power unit comprising:

a controllable torque transfer unit adapted to receive torque from two sources and transfer said torque to said output shaft;

an engine adapted to consume combustible fuel and supply torque to said torque transfer unit;

an electric motor adapted to receive electricity from a battery and supply torque to said torque transfer unit, said motor being further adapted to be operated as a generator;

a battery for supply of stored electric energy to said motor, and for receiving and storing electric energy from said motor when operated as a generator; and a controller for controlling the operation of said engine, said electric motor, and said torque transfer unit such that said torque transfer unit receives torque from either or both of said internal combustion engine and said electric motor and transmits torque therefrom to said drive wheels by way of said output shaft, and for controlling the relative contributions of the internal combustion engine and electric motor to the torque driving the wheels;

wherein said electric motor produces maximum power at a level at least equal to 100% of the maximum power of said internal combustion engine.

14. The vehicle of claim 13, wherein said electric motor produces maximum power at a level equal to between about 130% and about 200% of the maximum power of said internal combustion engine.

15. A method of operating a hybrid electric vehicle, said vehicle comprising:

a controllable torque transfer unit, operable to transfer torque in three modes (a) from either or both of two input shafts to an output member, said output member transmitting torque to drive wheels of said vehicle; (b) between said input shafts; and (c) from said output member to one or both of said input shafts;

an electric motor adapted to apply torque to a first of said input shafts responsive to supplied electrical energy, said motor being further operable in a generator mode, to provide electrical energy when driven by torque transferred thereto via said first input shaft;

a combustible-fuel-burning internal combustion engine adapted to apply torque to a second of said input shafts;

a battery adapted to supply electrical energy to and store energy received from said electric motor; and a controller adapted to receive input commands from a driver of said vehicle to monitor operation of said vehicle and to control operation of said controllable torque transfer unit, said motor, and said internal combustion engine, said method comprising the following steps:

selecting an appropriate mode of operation of said vehicle from the following possible modes of operation:

low speed running;
steady state running;
acceleration or hill climbing;
battery charging;
braking; and
engine starting;
selecting the appropriate flow paths of electrical energy and/or combustible fuel and of torque to effectuate the selected mode of operation; and
controlling operation of said controllable torque transfer unit, said electric motor and said internal combustion engine in accordance with said selected appropriate flow paths.

16. The method of claim 15, wherein during said low speed running mode of operation, said flow paths are controlled such that electrical energy flows from said battery to said electric motor, and torque flows from said electric motor to said torque transfer unit and thence to said drive wheels.

17. The method of claim 15, wherein during said steady state running mode of operation, said flow paths are controlled such that fuel flows from a supply thereof to said engine and torque supplied by said engine is transferred to said torque transfer unit and thence to said drive wheels.

18. The method of claim 15, wherein during said acceleration or hill climbing mode of operation, said flow paths are controlled such that electrical energy flows from said battery to said electric motor, fuel flows from a supply thereof to said engine and torque flows from said electric motor and said engine to said torque transfer unit and thence to said wheels.

19. The method of claim 15, wherein during said battery charging mode of operation, said flow paths are controlled such that fuel flows from a supply thereof to said engine and torque supplied by said engine is transferred to said motor, whereby electrical energy is transferred from said motor to said battery for storage therein.

20. The method of claim 19, wherein torque is further transferred from said engine to said wheels for propelling said vehicle during said battery charging mode of operation.

21. The method of claim 15, wherein during said braking mode of operation, said flow paths are controlled such that torque is transferred from said wheels to said motor, and electrical energy is transferred from said motor to said battery for storage therein.

22. The method of claim 15, wherein during said engine starting mode of operation, said flow paths are controlled such that electrical energy flows from said battery to said electric motor, and torque flows from said electric motor to said torque transfer unit and thence to said engine for starting said engine.

23. The method of claim 22, wherein during said engine starting mode of operation, said flow paths are controlled such that torque may additionally be transferred from said wheels to said torque transfer unit and thence to said engine for starting said engine.

24. The method of claim 15, wherein said battery supplies DC electrical energy, said electric motor operates on AC energy, said vehicle comprises a solid state switching network for conversion of DC to AC for powering said motor, and said controller controls operation of said switching network such that said DC is converted to AC of appropriate characteristics to effectuate the mode of operation thus determined.

25. The method of claim 24, wherein said battery supplies DC of no more than about 75 amperes to said solid-state switching network, said network comprising a plurality of semiconductor switching elements, said controller controlling switching of said elements to generate AC of appropriate characteristics.

26. The method of claim 24 wherein the frequency of said AC is controlled to be between about 120 and 1000 Hz and preferably between about 150 and about 600 Hz.

27. The method of claim 26, wherein said motor is operable in constant power and constant torque modes, and wherein the frequency of said AC is below about 150 Hz in constant torque operation and between about 150 and about 600 Hz in constant power operation.

28. The method of claim 15, wherein the ratios at which torque is transferred between said input shafts and said torque transfer unit and between said torque transfer unit and said wheels are fixed.

29. The method of claim 15, wherein said controllable torque transfer unit is operable in a locked mode, wherein torque supplied from one or both of said input shafts to said torque transfer unit is transmitted directly to said output member, and in a differential mode, wherein the ratio of the speed of said output member is fixed with respect to the difference in speed of said two input shafts, and comprising the step of selecting the operational mode of said torque transfer unit responsive to the selected mode of operation.

30. The method of claim 29, comprising the further step of operating said torque transfer unit in a limited-slip differential mode, wherein the speed of said output member is related to the difference in speeds of the two input shafts by a ratio differing from the corresponding effective ratio in said differential mode.

31. The method of claim 30, comprising the further step of varying the ratio of the speed of said output member to the difference in speeds of said input shafts in said limited-slip differential mode.

32. A hybrid electric vehicle, comprising:
a controllable torque transfer unit, operable to transfer torque in three modes: (a) from either or both of two input shafts to an output member, said output member transmitting torque to drive wheels of said vehicle; (b) between said input shafts; and (c) from said output member to one or both of said input shafts;
an electric motor adapted to apply torque to a first of said input shafts responsive to supplied electrical energy, said motor further being operable in a generator mode, to provide electrical energy when driven by torque transferred thereto via said first input shaft;
a combustible-fuel-burning internal combustion engine adapted to apply torque to a second of said input shafts;
a battery adapted to supply electrical energy to and store energy received from said electric motor; and
a controller adapted to receive input commands from a driver of said vehicle to monitor operation of said vehicle and to control operation of said controllable torque transfer unit, said motor, and said internal combustion engine, wherein said controller comprises means for performing the following functions responsive to input commands and monitored operation of said vehicle:
selecting an appropriate mode of operation of said vehicle from at least the following possible modes of operation:

low speed running;
steady state running;
acceleration or hill climbing;
battery charging;
braking; and
engine starting;
selecting the appropriate flow paths of electrical energy and/or combustible fuel and of torque to effectuate the selected mode of operation; and
controlling operation of said controllable torque transfer unit, said electric motor and said internal combustion engine in accordance with said selected appropriate flow paths and selected mode of operation.

33. The vehicle of claim 32, wherein said controllable torque transfer unit comprises first and second input gears connected to said first and second input shafts and an output gear controllably connected to said output member, means actuable by said controller for controlling connection of said output gear to said output member, whereby said controller controls transfer of torque through said torque transfer unit.

34. The vehicle of claim 33, wherein said torque transfer unit is operable in a first locked mode, in which all torque supplied by one or both of said input shafts is transferred to said output members directly, and a differential mode, in which the speed of said output member is equal to the difference in speed of said input shafts, and wherein said controller controls the mode of operation of said torque transfer unit responsive to the selected mode of operation.

35. The vehicle of claim 34, wherein in both said locked and differential modes of operation of said torque transfer unit, the respective rates of rotation of said gears of said torque transfer unit and of the corresponding input shafts, and the respective rates of rotation of said output member and said wheels are fixed.

36. The vehicle of claim 34, wherein said torque transfer unit is further operable in a limited-slip differential mode, wherein the speed of the output member is proportional to the difference in speed of the input shafts, said limited-slip differential mode being selectible by said controller.

37. The vehicle of claim 36, wherein said controller is further enabled to select said proportion from a range thereof.

38. The vehicle of claim 32, wherein said battery supplies DC electrical energy, said electric motor operates on AC energy, said vehicle further comprising a solid state switching network for conversion of DC to AC for powering said motor, and wherein said controller controls operation of said switching network such that said DC is converted to AC of appropriate characteristics to effectuate the mode of operation thus determined.

39. The vehicle of claim 38, wherein said battery supplies DC of less than about 75 amperes to said solid-state switching network, said network comprising a plurality of semiconductor switching elements, said controller controlling said elements to generate AC of appropriate characteristics.

40. The vehicle of claim 38, wherein said motor is a multipole induction motor.

* * * * *